US008676638B1

(12) United States Patent
Blair et al.

(10) Patent No.: US 8,676,638 B1
(45) Date of Patent: Mar. 18, 2014

(54) SYSTEM AND METHOD FOR DETERMINING AN ADVERTISEMENT PLAN

(75) Inventors: Margaret H. Blair, Isumam, FL (US); Francis L. Findley, Boonville, IN (US); Thomas C. Tindle, Evansville, IN (US)

(73) Assignee: MSW.ARS LLC, Lake Success, NY (US)

(*) Notice: Subject to any disclaimer, the term of this patent is extended or adjusted under 35 U.S.C. 154(b) by 3505 days.

(21) Appl. No.: 10/967,507

(22) Filed: Oct. 18, 2004

Related U.S. Application Data

(60) Provisional application No. 60/557,041, filed on Mar. 26, 2004.

(51) Int. Cl.
*G06Q 30/00* (2012.01)
*G06Q 90/00* (2006.01)

(52) U.S. Cl.
CPC ....................................... *G06Q 90/00* (2013.01)
USPC ......................................................... 705/14.1

(58) Field of Classification Search
USPC .................................................. 705/14, 14.1
See application file for complete search history.

(56) References Cited

U.S. PATENT DOCUMENTS

2003/0065603 A1* 4/2003 Aihara et al. .................... 705/36

OTHER PUBLICATIONS

Peter Klein et al., "Does Advertising Pay?—Measuring your advertising's effect on sales and profits", ANA/The Advertiser, Oct. 2002, 4 pgs.

* cited by examiner

*Primary Examiner* — Daniel Lastra
(74) *Attorney, Agent, or Firm* — Amster, Rothstein & Ebenstein LLP

(57) ABSTRACT

A system and method for determining an advertisement plan includes determining the in-market results of an advertisement prior to publication and optimizing the distribution of media weight among the advertisements of the advertisement plan. The in-market results are determined based on the sales effectiveness and the effective delivery of the advertisement. The distribution of media weight is optimized based on the sales effectiveness of the advertisements of the advertisement plan and an effective delivery per media weight ratio. The in-market results and the optimization of the distribution of media weight may be transmitted to a client machine over a network.

55 Claims, 26 Drawing Sheets

SYSTEM AND METHOD FOR DETERMINING AN ADVERTISEMENT PLAN

This patent application claims priority to and the benefit of U.S. Provisional Patent Application No. 60/557,041, filed on Mar. 26, 2004.

BACKGROUND OF THE INVENTION

The present disclosure relates generally to systems and methods for advertisement planning, and more particularly to systems and methods for forecasting the effectiveness of an advertisement.

Advertisement planning typically includes selecting a number of advertisements based on one or more criteria including the rating of the advertisement. Advertisements, including television, printed, and radio advertisements, are often rated according to their sales effectiveness. The sales effectiveness of an individual advertisement may be determined using one of a number of methods and measuring metrics. For example, the sales effectiveness of an advertisement may be measured by copy testing the advertisement or estimated by a benchmark such as the FAIR SHARE degree-of-difficulty benchmark. However, the sales effectiveness of an advertisement, by itself, provides limited insight to the impact on business results, such as category sales or market share, attributable to the advertisement.

Measurement methods, such as market mix modeling, were developed to determine the contribution to business results attributable to an advertisement or advertisement plan. Such measurement methods determine the advertisement's contribution to business results based on historic data related to the advertisement. Accordingly, current measurement methods, such as market mix modeling, determine an advertisement's contribution to business results subsequent to the publication of the advertisement. However, in many business applications, it is desirable to determine the contribution to business results of an advertisement(s) prior to the publication (i.e., printed publication or airing) of the advertisement(s).

SUMMARY OF THE INVENTION

The present invention comprises one or more of the features recited in the appended claims and/or the following features which, alone or in any combination, may comprise patentable subject matter:

A method for determining an in-market result of an advertisement is provided. The method may include determining a media weight value associated with the advertisement. The method may also include determining a wearout value associated with the advertisement. An effective delivery may be determined based on the media weight value and the wearout value. The method may further include determining a sales effectiveness value of the advertisement. The method may include determining an in-market result value based on the effective delivery value and the sales effectiveness value.

Alternatively, the method may include determining a media weight value associated with the advertisement and an initial sales effectiveness of the advertisement. The method may also include determining at least one of a distribution value of a product advertised in the advertisement and a price value of the product. The method may further include determining a final sales effectiveness value of the advertisement based on the initial sales effectiveness value and the distribution and/or price value. An in-market result value based on the media weight value and the sales effectiveness value.

A method for distributing a total media weight value among a plurality of advertisements is also provided. The method may include dividing the total media weight value into a number of media weight portions. The method may also include determining a sales effectiveness value for each of the number of advertisements. An effective delivery per media weight portion value for each of the number of advertisements may be determined. The method may include calculating a selling power value for each advertisement of the number of advertisements. The selling power value may be calculated based on the respective sales effectiveness value and the respective effective delivery per media weight portion value associated therewith and on one of the number of media weight portions. The method may further include applying one of the number of media weight portions to an advertisement of the number of advertisements having the largest selling power value determined in the calculating step.

A network server is also provided. The network server may include a processor and a memory device electrically coupled to the processor. The memory device may have stored therein a plurality of instructions which, when executed by the processor may cause the processor to retrieve from a client machine a media weight value associated with the advertisement. The processor may also determine a wearout value associated with the advertisement. Additionally, the processor may determine an effective delivery value of the advertisement based on the media weight value and the wearout value. The processor may also retrieve from the client machine an initial sales effectiveness value of the advertisement. The processor may further determine a final sales effectiveness value based on the initial sales effectiveness value. The processor may also determine an in-market result value of the advertisement based on the effective delivery value and the sales effectiveness value. The processor may further transmit the in-market result value to the client machine.

Alternatively, the memory device may have stored therein a plurality of instructions which, when executed by the processor may cause the processor to retrieve from a client machine a total media weight value. The processor may also divide the total media weight value into a number of media weight portions. The processor may further retrieve an initial sales effectiveness value of each advertisement of a number of advertisements from the client machine. In addition, the processor may determine a final sales effectiveness value of each advertisement based on the initial sales effectiveness value of the each advertisement. The processor may also determine an effective delivery per media weight portion value of each advertisement of the number of advertisements. The processor may calculate a selling power value of each advertisement of the number of advertisements based on the sales effectiveness value associated with the each advertisement, the effective delivery per media weight portion associated with the each advertisement, and one of the number of media weight portions. The processor may further apply the one of the number of media weight portions to an advertisement of the number of advertisements having the largest selling power value determined in the calculate step.

An article comprising a computer-readable signal-bearing medium is also provided. The medium may have herein a plurality of instructions which, when executed by a processor, cause the processor to determine a media weight value associated with an advertisement. The processor may also determine a wearout value associated with the advertisement. The processor may further determine an effective delivery value of the advertisement based on the media weight value and the wearout value. In addition, the processor may determine a sales effectiveness value of the advertisement. The processor may also determine an in-market result value of the advertisement based on the effective delivery value and the sales effectiveness value.

Alternatively, the plurality of instructions may cause the processor to determine a total media weight value. The processor may also divide a total media weight value into a number of media weight portions. The processor may also determine a sales effectiveness value of each advertisement of a number of advertisements. Additionally, the processor may determine an effective delivery per media weight portion value of each advertisement of the number of advertisements. Further, the processor may calculate a selling power value of each advertisement of the number of advertisements based on the sales effectiveness value associated with the each advertisement, the effective delivery per media weight portion associated with the each advertisement, and one of the number of media weight portions. The processor may also apply one of the number of media weight portions to an advertisement of the number of advertisements having the largest selling power value determined in the calculating step.

The above and other features of the present disclosure, which alone or in any combination may comprise patentable subject matter, will become apparent from the following description and the attached drawings.

BRIEF DESCRIPTION OF THE DRAWINGS

The detailed description particularly refers to the following figures, in which:

FIGS. 5-26 illustrate various screen displays which are displayed on a display monitor during operation of the system of FIG. 1.

DETAILED DESCRIPTION OF THE DRAWINGS

Figure 1:
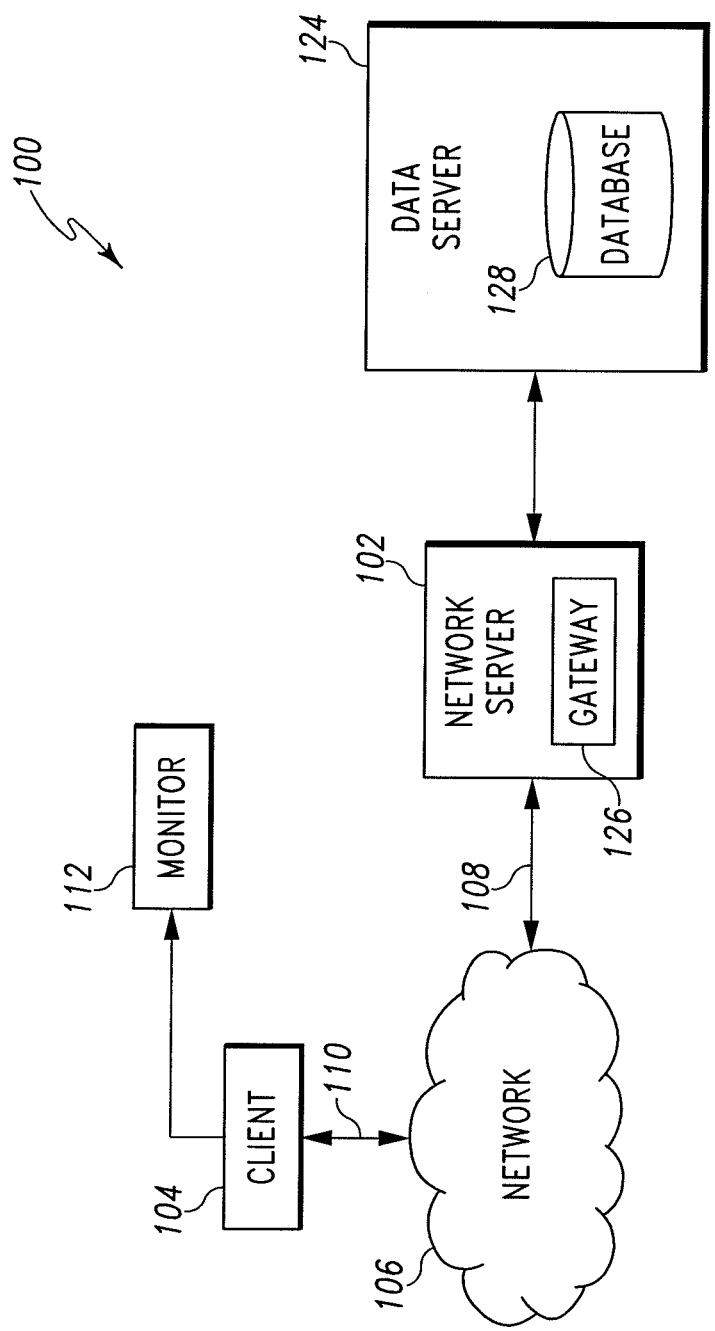
FIG. 1 is a simplified diagram of a network-based system for determining an advertisement plan.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

The present disclosure is directed to a system and method for determining an advertisement plan including forecasting the contribution to business results of the advertisement(s) and optimizing advertising spending. Forecasting the contribution to business results of an advertisement includes forecasting, predicting, or otherwise determining the in-market results, as measured by an appropriate business metric, attributable to the advertisement prior to the publication of the advertisement. As used herein, the term "advertisement" is intended to mean any form of advertisement including, but not limited to, television, printed, and radio advertisements. Additionally, the singular form of the term "advertisement" is used to refer to a single advertisement or an advertisement plan comprising any number of separate advertisements. Typically, an advertisement is used to advertise one or more products. As such, the term "product" is used herein to refer to any item(s) or service(s) offered via the advertisement.

Referring now to FIG. 1, a network-based system 100 for determining an advertisement plan has a network server machine 102 which communicates with a client machine 104 via a network 106. A data server 124 is coupled to the network server 102. Typically, the network server 102 and the data server 124 are operated and/or maintained by an advertisement analysis company, whereas the client machine 104 is under the control of the user. Although only one network server 102, one client 104, and one data server 124 are shown in FIG. 1, it should be appreciated that the system may include any number of network servers 102, clients 104, or data servers 124.

In a conventional manner, each of the network servers 102, the clients 104, and the data servers 124 includes a number of components commonly associated with such machines. For example, although not shown in detail in the drawings, each of the network servers 102, the clients 104, and the data servers 124 may include, amongst other things customarily included in such machines, a central processing unit ("CPU"), a non-volatile memory such as a read only memory ("ROM"), a volatile memory such as a random access memory ("RAM"), and one or more data storage devices. It should also be appreciated that such components may be integrated into a single housing or may be provided as a number of separate, discrete devices. It should also be realized that the network server 102, the client 104, and the data server 124 may be operated with known, commercially available software operating systems.

As such, the network server 102 may be embodied as any type of commercially available network server. The storage devices associated with the network server 102 maintain a number of databases and files which are utilized in the construction and operation of an information portal such as a website. As will be described in greater detail below, the network server 102 also functions as a gateway 126 for exchanging information across networks that are incompatible and that use different protocols. The gateway 126 may be embodied as any combination of commercially available hardware and/or software that connects different types of networks such that information can be exchanged there between.

Similarly, the data server 124 may be embodied as any type of commercially available data server. The storage devices associated with the data server 124 maintain a number of databases and files which are utilized in the construction and operation of the system.

It should be appreciated that although shown in FIG. 1 as being discrete components, a common component may be used as both the network server 102 and the data server 124. In particular, the functionality of both devices may be executed by a single machine utilizing the appropriate network and data storage software and hardware.

The client 104 includes an output device such as a display monitor 112 for displaying a number of images to the user. As such, the client 104 may be embodied as any type of commercially available computing device such as a personal computer ("PC"). Moreover, the client 104 may also be embodied as a "mobile" device such as a cellular phone, a mobile data terminal, a portable computer, a personal digital assistant ("PDA"), or some other device of similar kind.

As shown in FIG. 1, the network server 102 is coupled to the network 106 via a communication link 108, whereas the client 104 is coupled to the network 106 via a communication link 110. It should be appreciated that each of the communication links 108, 110 may be provided as any number or type of data link including both wired and wireless data links. Moreover, it should also be appreciated that one or more intervening modems (not shown), data routers (not shown), and/or internet service providers ("ISPs") (not shown) may be used to transfer the data between the network server 102, the client 104, and the network 106.

The network 106 of the present disclosure may be embodied as any type of network such as a LAN, WAN, or wireless network. Moreover, in a specific illustrative embodiment, the network 106 is embodied as a publicly-accessible global network such as the Internet.

A user may utilize the client 104 to access information stored on the network server 102 (or on a device associated with the server 102). In the case of an internet-based system (i.e., the network 106 is embodied as the Internet), the server 102 is embodied as a web server and, as such, hosts a website which may be accessed by the user from the client 104. In such cases, access to the website may be password protected thereby restricting access to website to those users registered with the host. In any event, once a user accesses the website, a user interface application is downloaded from the server machine 102 to the client machine 104 via the network 106 for display to the user on the display monitor 112. In one specific embodiment, the database 128 is "hard coded" in the user interface application and is downloaded from the server machine 102 to the client machine 104 contemporaneously with the user interface application.

The user may interact with the user interface application by, for example, entering data into one or more data fields. The user may enter data via direct data input (i.e., the entering of data via a keyboard coupled to the client 104) or by choosing a selection from an associated menu of choices. A menu may be used for data entry in those data input fields in which a restricted range of acceptable values, data, or other choices is desirable to, for example, reduce the possibility of entering incorrect data. To do so, the data input field may be embodied to include a pull-down button. Typically, the menu is "hidden" until a user of the application selects the pull-down button to "call up" or otherwise display the menu. Once a user has made a selection from the menu, the menu is once again "hidden" or otherwise removed from the display of the application and the selected value or menu choice is displayed in the associated data input field.

While using the user interface application, the user may provide data relevant to an advertisement plan such as sales effectiveness data, media weight data, product pricing data, distribution data, competitive environment data, airing pattern data, and the like. User submitted data is transmitted to the network server 102 via the network 106. The network sever 102, or other processing machine coupled to network server 102, may use an algorithm for forecasting an advertisement's contribution to business results, such as algorithm 10 described below in regard to FIG. 2, to determine the future contribution to business results of the advertisement(s) based on the user supplied data. The determined business metric (e.g., percent of category volume impacted, percent of category volume decrease in absence of advertising, etc.) is subsequently transmitted back to the client machine 104 across the network 106 and displayed to the user via the user interface application. In addition, network sever 102, or other processing machine may use an algorithm for optimizing advertisement spending, such as algorithm 50 or algorithm 80 described below in regard to FIGS. 3 and 4, respectively, to optimize media spending based on total media budget, media units, or other criteria.

Figure 2:
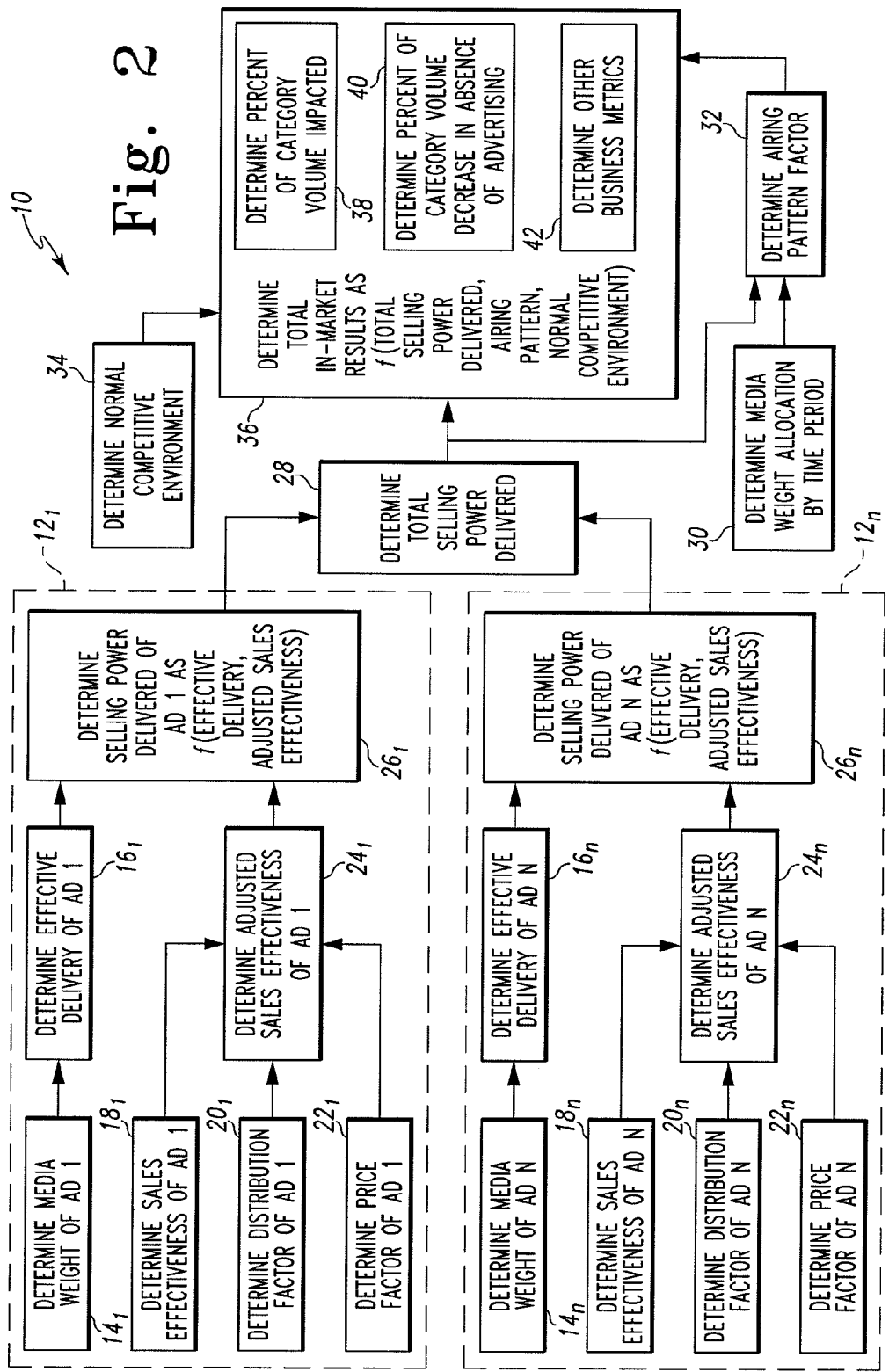
FIG. 2 is a flow diagram of an algorithm for forecasting the contribution to business results of an advertisement(s) used by the system of FIG. 1.

Referring now to FIG. 2, an algorithm 10 for forecasting an advertisement's contribution to business results includes a number of steps $12_n$ in which the selling power delivered of an advertisement is determined. Specifically, the algorithm 10 includes a step 12 for each advertisement in an advertisement plan which may include any number of advertisements. Accordingly, algorithm 10 may include any number of steps 12 depending on the total number of advertisements. Typically, each advertisement in the advertisement plan is a different or modified version of an advertisement for the same product.

Each step $12_n$ includes a number of sub-steps which will be described herein-after in reference to step $12_1$ with the understanding that the sub-steps of each step $12_n$ are similar and, as such, the descriptions of each sub-step of step $12_1$ are applicable. As illustrated in FIG. 2, the selling power of a particular advertisement is determined in each step $12_n$ based on the effective delivery of the advertisement and the adjusted sales effectiveness of the advertisement. The effective delivery of an advertisement is a representation of the media weight placed behind the advertisement adjusted by the wearout, if any, of the advertisement. The adjusted sales effectiveness of the advertisement is the in-market sales effectiveness of the advertisement and includes the sales effectiveness of the advertisement adjusted by the distribution level of the product advertised and the price of the advertised product relative to the product category average.

The media weight of the advertisement is determined in step 14. The media weight of the advertisement may be pre-determined based on actual or planned spending levels and supplied by the advertiser or may be determined by, for example, a media spending optimization algorithm as described below in regard to FIGS. 3 and 4. The media weight of an advertisement is a representation of the amount of spending placed behind the advertisement. In applications in which more than one advertisement are included in the advertisement plan, each advertisement may have varying media weights which may also vary over time (e.g., by advertising period such as monthly or quarterly). Typically, the media weight of an advertisement is represented in terms of Gross Rating Points (hereinafter, sometimes GRPs) or media dollars. In those embodiments in which the media weight is represented in media dollars, the media weight is converted to GRPs using a cost per GRP conversion. The cost per GRP is typically provided by the publication company (e.g., the television station or magazine company). Typically, the cost per GRP varies depending on the length of the advertisement along with other factors.

In step 16, the effective delivery of the advertisement is determined. The effective delivery of an advertisement is the percent of that advertisement's sales effectiveness delivered to market as calculated by the media weight of the advertisement as determined in step 14 and a wearout constant. Wearout of an advertisement is the decline in selling power of an advertisement over time and exposures. To represent such decline, the wearout decreases the sales effectiveness of the advertisement based on the degree to which the advertisement has been published. In the illustrative embodiment, the effective delivery of the advertisement is determined based on the following equation:

$$\text{Effective Delivery} = (1 - e^{C1*MW})$$

wherein $C_1$ is a wearout constant and MW is the media weight of the advertisement expressed in GRPs as determined in step 14. The wearout constant, $C_1$, is determined based on historical data of the in-market sales effectiveness of advertisements and, accordingly, may change over time as the historical data changes. In one specific embodiment, the wearout constant equals −0.000633.

In step 18, the sales effectiveness of the advertisement is determined. The sales effectiveness of the advertisement may be determined using one of a number of methods. For example, the sales effectiveness of an advertisement may be measured by copy testing the advertisement or estimated by a benchmark such as the FAIR SHARE degree-of-difficulty benchmark. As such, the sales effectiveness of the advertisement may be represented by one of a number of effectiveness metrics or scores such as the ARS PERSUASION score developed by rsc THE QUALITY MEASUREMENT COMPANY of Evansville, Ind. or the COPY EFFECTIVENESS INDEX developed by IPSOS-ASI of Paris, France.

In steps 20 and 22, a distribution factor and/or a price factor, respectively, are determined. Typically such factors are determined for advertisements of products new to the market (e.g., new products having just recently been offered for sale). However, one or both of these factors may be included if the products advertised have in-market behavior similar to new products.

In step 20, a distribution factor of the advertisement is determined. The distribution factor of the advertisement is a representation of the distribution level of the product offered in the advertisement. In one embodiment, the distribution factor is based on the percentage of outlets in which the product is available. In the illustrative embodiment, the distribution factor is determined based on the following equation:

$$\text{Distribution Factor} = C_2 * \ln(\%\text{Distribution}) + C_3$$

wherein $C_2$ is a first distribution constant, %Distribution is the percentage of outlets in which the product is available (i.e., the number of outlets in which the product is available divided by the total number of outlets in which products of the same and/or similar category are available), and $C_3$ is a second distribution constant. The distribution constants, $C_2$ and $C_3$, are determined based on historical data of the in-market sales effectiveness of advertisements and, accordingly, may change over time as the historical data changes. In the illustrative embodiment, the first distribution constant, $C_2$, is equal to 0.215 and the second distribution constant, $C_3$, is equal to 1.0.

A price factor of the advertisement is determined in step 22. The price factor of the advertisement is a representation of the price premium index of the product offered in the advertisement. Because consumers are generally aware of product pricing of existing products, the price factor of the advertisement is typically used only with advertisements for new products. In one embodiment, the price factor is based on the price of the product advertised relative to the product category's average price. In the illustrative embodiment, the price factor is determined based on the following equation:

$$\text{Price Factor} = PP/AP$$

wherein PP is the price of the product offered in the advertisement and AP is the average product category price. Because each advertisement in an advertisement plan advertises the same product, the price factor will typically be the same value for each advertisement (i.e., the values determined in steps $22_1$-$22n$ will be equal).

In step 24, the adjusted sales effectiveness of the advertisement is determined. The adjusted sales effectiveness of the advertisement is the sales effectiveness of the advertisement as determined in step 18 adjusted by, if applicable, the distribution factor determined in step 20 and the price factor determined in step 22. Accordingly, the sales effectiveness of the advertisement is modified based on the distribution level and the price premium index of the product offered in the advertisement. In the illustrative embodiment, the adjusted sales effectiveness of the advertisement is determined based on the following equation:

$$\text{Adjusted Sales Effectiveness} = (SE*DF)/PF$$

wherein SE is the sales effectiveness of the advertisement as determined in step 18, DF is the distribution factor of the advertisement as determined in step 20, and PF is the price factor of the advertisement as determined in step 22. In applications in which the product is not new to the market, the distribution factor, DF, and the price factor, PF, is set to 1.0.

In step 26, the selling power delivered of the advertisement is determined. The selling power delivered of the advertisement is a representation of the effect that the advertisement will have on consumer preference for the advertised brand or product. In some embodiments, the selling power delivered is equal to the sale effectiveness of the advertisement. In the illustrative embodiment, the selling power delivered of the advertisement is a function of the effective delivery of the advertisement as determined in step 16 and the adjusted sales effectiveness of the advertisement as determined in step 24. Illustratively, the selling power delivered is determined based on the following equation:

$$\text{Selling Power Delivered} = ED*ASE$$

wherein ED is the effective delivery of the advertisement as determined in step 16 and ASE is the adjusted sales effectiveness of the advertisement as determined in step 24.

However, it should be appreciated that in other embodiments or implementations, the selling power delivered may be determined directly based on a single equation and applicable inputs:

$$SPD = [(1 - e^{C_1 * MW}) * (SE*(C_2 * \ln(\%\text{Distribution}) + C_3) / (PP/AP))]$$

wherein SPD is the selling power delivered, $C_1$ is the wearout constant, MW is the media weight of the advertisement expressed in GRPs, SE is the sales effectiveness of the advertisement, $C_2$ is the first distribution constant, %Distribution is the percentage of outlets in which the product is available, $C_3$ is the second distribution constant, PP is the price of the product offered in the advertisement, and AP is the average product category price. Accordingly, it should be appreciated that the algorithm 10 may be implemented with various mathematical forms of the disclosed equations and, as such, the present disclosure should not be limited to the specific mathematical forms of disclosed equations.

The total delivered selling power of the advertisement plan is determined in step 28. The total delivered selling power is a representation of the effect the total advertisement plan will have on consumer preference for the advertised brand or product. The total selling power delivered is based on the selling power delivered for each advertisement as determined in steps $12_1$-$12_n$. Illustratively, the total selling power delivered of the advertisement plan is determined by summing the delivered selling power of each advertisement.

Referring to step 30, the total media weight allocated per time period of the advertisement plan is determined. The time periods of the advertisement plan may be organized as any suitable time division in which the effectiveness of advertisements are to be determined. For example, the time periods may be weeks, months, quarters, years, or some other time division. The total media weight allocated per time period is a representation of the airing pattern of the advertisement. Based on the media weight allocated per time period, a flighting variable may be determined for the airing pattern of the advertisement. An airing pattern is flighted if there are any time periods in which no advertisement is published. Accordingly, the flighting variable is defined as a 0.0 if the airing pattern of the advertisement(s) is continuous and as 1.0 if the airing pattern of the advertisement is flighted (e.g., the existence of advertising periods in which no advertisement is published).

An airing pattern factor is determined in step 32 based on the total selling power delivered as determined in step 28 and the flighting variable determined in step 30. The airing pattern factor is a representation of the effect on the in-market sales effectiveness of an advertisement of the airing pattern of the advertisement (i.e., if the airing pattern is constant or flighted) . In the illustrative embodiment, the airing pattern factor is determined based on the following equation:

$$\text{Airing Pattern Factor}=C_4*\text{TSPD}*\text{FV}$$

wherein $C_4$ is an airing pattern constant, TSPD is the total selling power delivered as determined in step 28, and FV is the flighting variable as determined in step 30. The airing pattern constant, $C_4$, is determined based on historical data of the in-market sales effectiveness of advertisements under continuous and flighted conditions and, accordingly, may change over time as the historical data changes. In the illustrative embodiment, the flighting variable is equal to −0.0115.

In step 34, a normal competitive environment factor is determined. The normal competitive environment factor is a representation of the advertised product's category's "elasticity" to marketing activity including advertising. In one embodiment, the airing pattern factor is determined based on the number of distinct brands in the advertised product's category. In the illustrative embodiment, the normal competitive environment factor is determined based on the following equation:

$$\text{Normal Competitive Environment}=((C_5*C_6)/\text{NV})$$

wherein $C_5$ is a first normal competitive environment constant, $C_6$ is a second normal competitive environment constant, and NV is a normal competitive environment variable. The normal competitive environment variable is equal to the number of distinct brands in the advertised product's category. Accordingly, the normal competitive environment variable may vary according to how the product's category is defined. The normal competitive environment constants, $C_5$ and $C_6$, are determined based on historical data of the in-market sales effectiveness of advertisements and, accordingly, may change over time as the historical data changes. In the illustrative embodiment, the first normal competitive environment constant, $C_5$, is equal to 3.33 and the second normal competitive environment constant, $C_6$, is equal to 24.6.

The total in-market results of the advertisement is determined in step 36. The total in-market results of the advertisement is a forecast of the contribution to business results of the advertisement or advertisements. As such, any one of a number of business metrics may be determined in step 36. Accordingly, although exemplary business metrics are discussed below, it should be appreciated that other business metrics may be determined. To do so, step 36 includes one or more sub-steps in which different business metrics are determined. Each business metric may be based off of any one or combination of inputs such as the media weight of the advertisement, determined values such as the total selling power delivered, or other determined results such as the percent of category volume impacted discussed below in regard to step 38.

The percent of category volume impacted is determined in step 38. The percent of category volume impacted is a forecast of the change in the advertised product's percentage of the category volume due to the advertisement. In one embodiment, the percent of category volume impacted is forecasted based on the total selling power delivered of the advertisement, the normal competitive environment of the advertisement, and the airing pattern of the advertisement. In the illustrative embodiment, the percent of category volume impacted is forecasted based on the following equation:

$$\text{Percent of Category Volume Impacted}=C_7*\text{TSPD}*\text{APF}*\text{NCE}$$

wherein $C_7$ is a category volume impacted constant, TSPD is the total selling power delivered as determined in step 28, APF is the airing pattern factor as determined in step 32, and NCE is the normal competitive environment factor as determined in step 34. The category volume impacted constant, $C_7$, is determined based on historical data of the in-market sales effectiveness of advertisements and the particular product category of the advertised product. Accordingly, the category volume impacted constant may change over time as the historical data and/or product category change. In the illustrative embodiment, the category volume impacted constant, $C_7$, is equal to 0.0584

The percent of category volume decrease in the absence of advertising may be determined in step 40. This business metric is a forecast of the effect to business results as measured by a decrease in category volume resulting from the absence of any advertising for the advertising period in questions (e.g., yearly quarter). In one embodiment, the percent of category volume decrease is determined based on the normal competitive environment. In the illustrative embodiment, the percent of category volume decrease in the absence of advertising is determined based on the following equation:

$$\text{Percent of Category Volume Decrease}=C_8*\text{NCE}$$

wherein $C_8$ is a category volume decrease constant and NCE is the normal competitive environment factor as determined in step 34. The category volume decrease constant, $C_8$, is determined based on historical data of the in-market sales effectiveness of advertisements and, accordingly, may change over time as the historical data changes. In the illustrative embodiment, the category volume decrease constant is equal to −0.0476.

In addition to the above two business metrics, other business metrics may be forecasted in step 36. For example, the volume impacted may be determined based on the percent category volume impacted and the total category volume (in dollars or other volume metric). Illustratively, the volume impacted is determined by multiplying the percent category volume impacted as determined in step 36 by the estimated or actual category volume. Additionally, the percent of brand volume impacted may be determined based on the volume impacted and the brand volume (in dollars or other volume metric). Illustratively, the percent of brand volume impacted is determined by dividing the determined volume impacted by the estimated or actual brand volume. Further, the share change attributable to the advertisement may be determined based on the percent of category volume impacted and the percent of category volume decrease in absence of advertising. Illustratively, the share change is determined by subtracting the percent of category volume decrease in absence of advertising as determined in step 40 from the percent of category volume impacted as determined in step 38. Yet further, the change in brand volume may be determined based on the share change and the category volume (in dollars or other volume metric). Illustratively, the change in brand volume is determined by multiplying the share change by the estimated or actual category volume. Still further, other business metrics may be determined in addition to those described including, but not limited to, media efficiency, return on investment, payback periods, and the like.

Although the algorithm 10 is illustratively described in regard to a number of intermediary determination steps in which values and calculation factors are determined prior to the determination of the total in-market results, it should be appreciated that the total in-market results may be determined based on a single algorithm and applicable inputs. For example, in some embodiments of the present disclosure, the percent of category volume impacted may be forecasted in step 34 based on the following equation:

$$PCVI=(C_7*C_4*FV)*SE*[(C_2*\ln(\%Distribution)+C_3)/(PP/AP)]*(1-e^{C1*MW})*((C_5*C_6)/NV)$$

wherein $C_7$ is a category volume impacted constant, $C_1$ is a wearout constant, MW is the media weight of the advertisement expressed in GRPs, SE is the sales effectiveness of the advertisement, $C_2$ is the first distribution constant, %Distribution is the percentage of outlets in which the product is available, $C_3$ is the second distribution constant, PP is the price of the product offered in the advertisement, AP is the average product category price, $C_4$ is an airing pattern constant, FV is the flighting variable defined as a "0" is the airing pattern of the advertisement(s) is continuous and as "1" if the airing pattern of the advertisement is flighted, $C_5$ is a first normal competitive environment constant, $C_6$ is a second normal competitive environment constant, and NV is a normal competitive environment variable.

It should be appreciated that determining the contribution to business results of the advertisement based on the total selling power delivered of the advertisement, the normal competitive environment of the advertised product, the product price, and the level of distribution of the product improves the accuracy of the forecast. However, in other embodiments or applications such as embodiments wherein a lower degree of accuracy is tolerable or required, the contribution to business results of the advertisement may be determined on any one or combination of selling power delivered of the advertisement, the normal competitive environment of the advertised product, the product price, and the level of distribution of the product.

Figure 3:
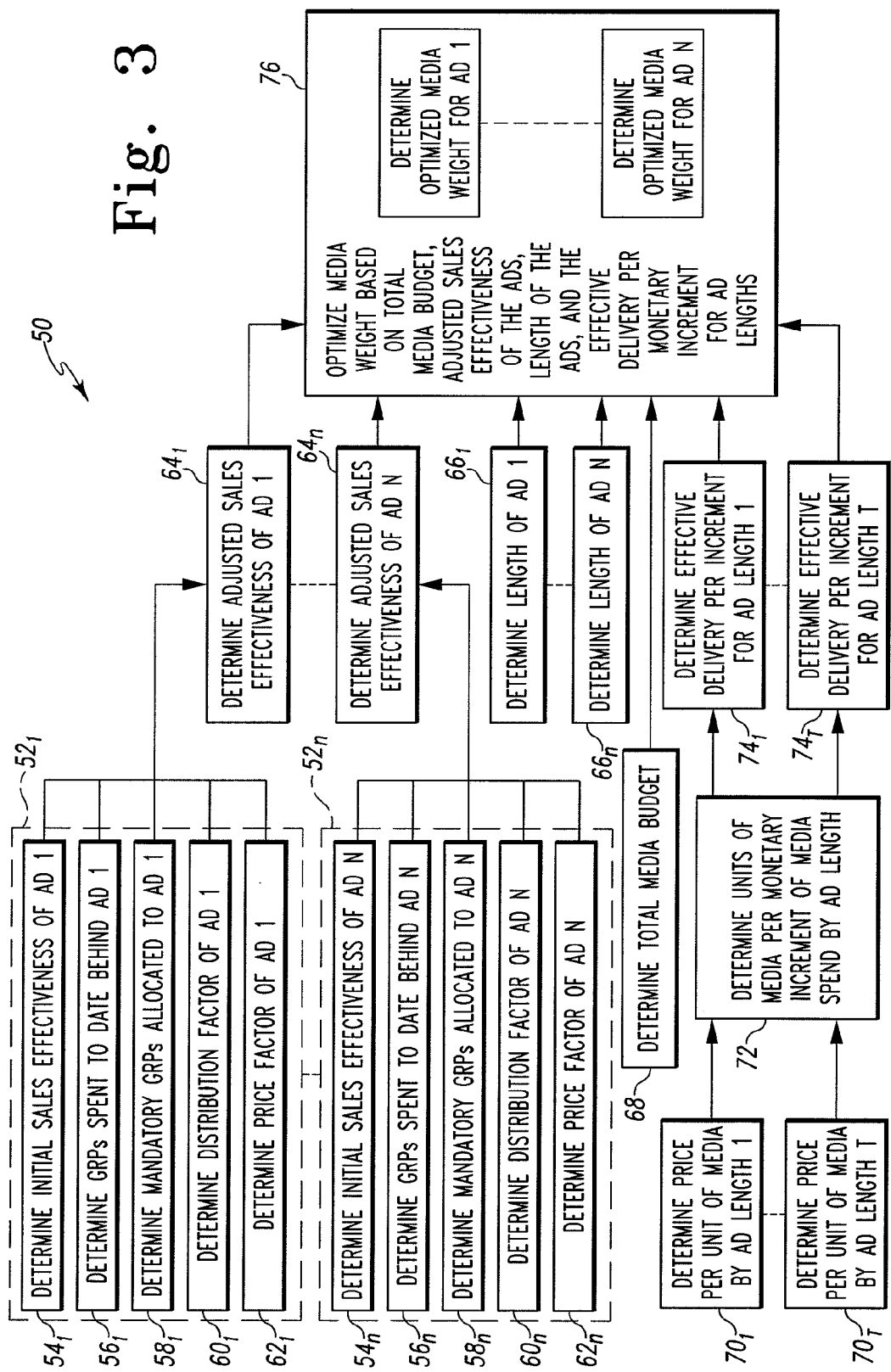
FIG. 3 is a flow diagram illustrating one embodiment of an algorithm for optimizing allocation of advertising spending used by the system of FIG. 1.
Figure 4:
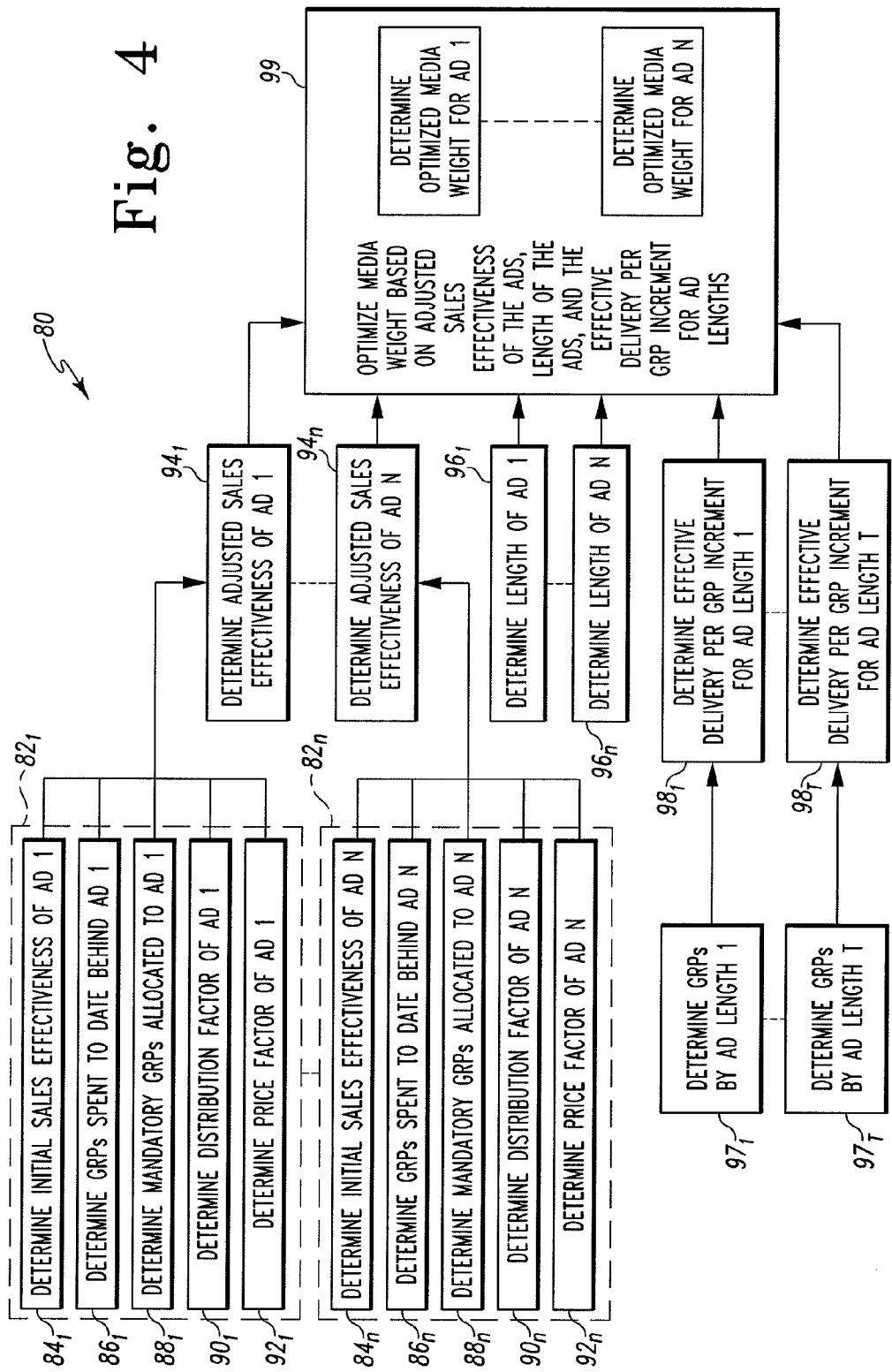
FIG. 4 is a flow diagram illustrating another embodiment of an algorithm for optimizing allocation of advertising spending used by the system of FIG. 1.
Figure 5:
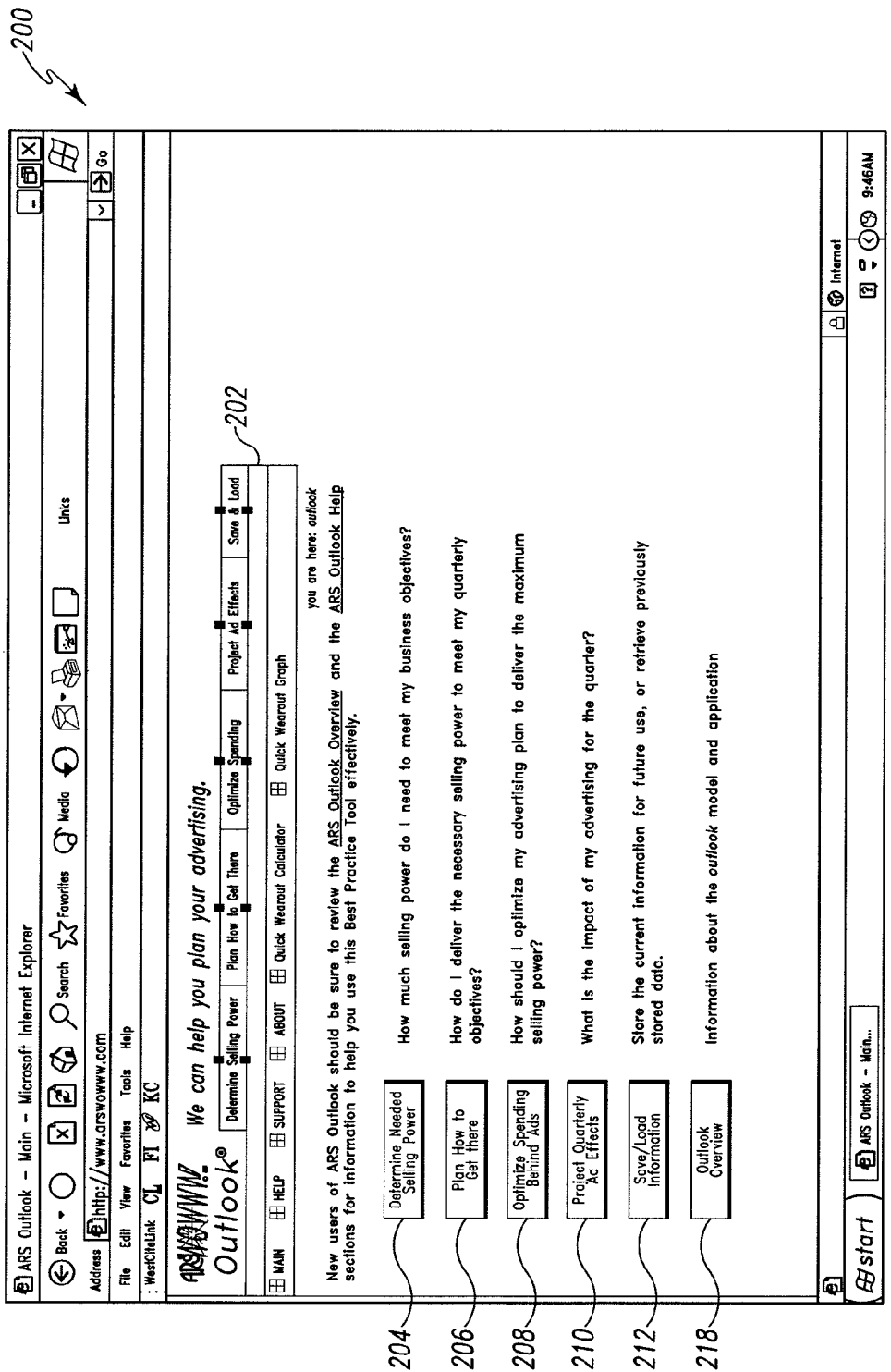

Referring now to FIGS. 3 and 4, in some applications, especially in those applications including multiple advertisements, it may be beneficial to optimize the distribution of media weight placed behind each advertisement to thereby produce the greatest in-market contribution to business results. Such optimizations may be performed by an optimization algorithm. An optimization algorithm may be executed by the system 100 to optimize the media weight of the advertisements based on any one or more of a number of advertising factors including, for example, total media budget and GRP inventories.

An algorithm 50 for optimizing the media weight of advertisements based on the total media budget is illustrated in FIG. 3. The algorithm 50 includes a number of steps $52_n$ in which a number of factors related to an advertisement are determined. Specifically, the algorithm 50 includes a step 52 for each advertisement in an advertisement plan which may include any number of advertisements. Accordingly, algorithm 50 may include any number of steps 52 depending on the total number of advertisements.

Each step $52_n$ includes a number of sub-steps which will be described herein-after in reference to step $52_1$ with the understanding that the sub-steps of each step $52_n$ are similar and, as such, the descriptions of each sub-step of step $52_1$ are applicable. As illustrated in FIG. 3, step 52 includes sub-steps 54, 56, 58, 60 and 62. Steps 54, 60, and 62 are similar to the steps 18, 20, and 22 of algorithm 10 described above in regard to FIG. 2. In step 54, the initial sales effectiveness of the advertisement is determined. The sales effectiveness of the advertisement is determined using one of a number of methods including copy testing and benchmark estimation as described above in regard to step 18 of algorithm 10. In step 60, the distribution factor of the advertisement is determined. The distribution factor is determined using a similar equation to the distribution factor equation used in step 20 of algorithm 10 discussed above in regard to FIG. 2. In addition, the price factor of the advertisement is determined in step 62. The price factor is determined using a similar equation to the price factor equation used in step 22 of algorithm 10 discussed above in regard to FIG. 1.

Further, in sub-step 56 of step 52, the total number of media weight, expressed in GRPs, spent to date behind the advertisement is determined. If the advertisement has never been published, the total number of GRPs is 0. However, if the advertisement has been published before, the total number of GRPs that has been placed behind the advertisement over the publishing life of the advertisement is determined. If the media weight that has been spent behind the advertisement is expressed in media dollars, the media weight is converted to GRPs as discussed above in regard to step 14 of algorithm 10.

In sub-step 58, the mandatory GRPs to be allocated to the advertisement is determined. If there are no minimum number of GRPs that must be allocated to the advertisement, the value determined in step 58 is 0. However, if it is desired that the advertisement be allocated a minimum number of GRPs, the value determined in step 58 is the predetermined minimum number of GRPs to be allocated to the advertisement.

In step 64, the adjusted sales effectiveness of the advertisement is determined using an equation similar to the equation used in step 24 of the algorithm 10 described above in regard to FIG. 2. The adjusted sales effectiveness of the advertisement is the initial sales effectiveness of the advertisement as determined in step 54 adjusted by, if applicable, the distribution factor determined in step 60 and the price factor determined in step 62.

In step 66, the length of the advertisement is determined. Typically, advertisements range in length from 15 second spots to 60 second spots in 15 second intervals. In addition, the total media budget is determined in step 68. The total media budget is a representation of the total amount of spending in dollars or other currency to be placed behind the advertisements.

Referring now to step 70, the price per unit of media by ad length is determined. The price per unit of media by ad length is a representation of the cost of each ad length per media unit (typically in GRPs). These values are typically provided by the advertising company (i.e., television station, radio station, etc.) and may be actual or estimated values. A price per unit of media is determined, at least, for every different advertisement length determined in step 66. In step 72, the units of media per monetary increment of media spend by ad length is determined. To do so, the total media budget as determined in step 68 is divided into a number of monetary increments. The monetary increments are generally of equal value and may be of any dollar amount. In the illustrative embodiment, the total media budget is divided into a number of $1,000.00 monetary increments. The monetary increment is then divide by the price per media for each advertisement length to determine a unit of media per monetary increment of media spent by advertisement length. For example, if a 15 second advertisement has a price of $2,000.00 per GRP and the monetary increment of the total budget is equal to $1,000.00, then the unit of media per monetary increment is equal to 0.5 GRP per monetary increment.

In step 74, the effective delivery per increment for the advertisement is determined. The effective delivery per increment of an advertisement is the unit of media per monetary increment modified by the wearout, if any, of the advertisement. The effective delivery is determined using an equation similar to the equation used in step 16 of the algorithm 10 described above in regard to FIG. 2 wherein MW is the unit of media per monetary increment as determined in step 72.

The allocation of available media weight is optimized based on the total media budget in step 76. To do so, the total available monetary increments as determined in step 72 are distributed among the advertisements in single increment steps. First, the monetary increments are distributed to those advertisements having a mandatory GRP allocation as determined in step 58. The monetary increments are so distributed until the advertisements have an allocation of GRPs equal to the mandatory GRP allocation determined in step 58. Subsequently, the selling power delivered of each advertisement is calculated based on the next monetary increment. The selling power delivered of each advertisement is a function of the adjusted sales effectiveness as determined in step 64 and the effective delivery per monetary increment as determined in step 74 based on the monetary increments placed behind the advertisement. Illustratively, the selling power delivered is determined based on the following equation:

$$\text{Selling Power Delivered} = ASE * EDI$$

wherein ASE is the adjusted sales effectiveness of the advertisement as determined in step 64 and EDI is the effective delivery of the advertisement per monetary increment as determined in step 74. To account for the wearout of the media weight already placed behind the advertisement to date, the ASE value includes the sum of all the monetary increments placed behind the advertisement and the converted value of the GRPs spent to date behind the advertisement as determined in step 56.

The monetary increment is applied to the advertisement having the largest selling power calculated based on the monetary increment. Additional monetary increments are applied to the same advertisement until any applicable wearout factors cause the incremental selling power delivered of the advertisement to decrease to the incremental level of the selling power delivered of another advertisement of the same length. The remaining monetary increments are subsequently distributed to the second advertisement of the same length until the incremental selling power delivered of the second advertisement "wears down" to the incremental selling power delivered of another advertisement of the same length. The distribution process continues until all monetary increments have been distributed or all advertisements have the same incremental selling power delivered at which point the remaining monetary increments are alternately distributed. Thus, after all the media units have been distributed in this way, an advertisement plan indicating the optimal allocation of media dollars to maximize the total selling power delivered is determined.

The media weight of advertisements may also be optimized based on GRP inventories. An algorithm 80 for optimizing the media weight of advertisements based on GRP inventories is illustrated in FIG. 4. Similar to algorithm 50 of FIG. 3, the algorithm 80 includes a number of steps $82_n$ in which a number of factors related to an advertisement are determined. Specifically, the algorithm 80 includes a step 82 for each advertisement in an advertisement plan which may include any number of advertisements. Accordingly, algorithm 80 may include any number of steps 82 depending on the total number of advertisements.

Each step $82_n$ includes a number of sub-steps which will be described herein-after in reference to step $82_1$ with the understanding that the sub-steps of each step $82_n$ are similar and, as such, the descriptions of each sub-step of step $82_1$ are applicable. As illustrated in FIG. 4, step 82 includes sub-steps 84, 86, 88, 90, and 92 which are substantially similar to the steps 54, 56, 58, 60, and 62 of algorithm 50, respectively. Specifically, similar to step 54, the sales effectiveness of the advertisement is determined in step 84. Similar to step 56, the total media weight, expressed in GRPs, spent to date behind the advertisement is determined in step 86. Similar to step 58, the mandatory GRPs to be allocated to the advertisement is determined in step 88. Similar to step 60, the distribution factor of the advertisement is determined in step 90. Additionally, similar to step 92, the price factor of the advertisement is determined in step 92. The equations used in process steps 84, 86, 88, 90, and 92 are substantially similar to the equations used in process step 54, 56, 58, 60, and 62 of algorithm 50, respectively.

Similar to step 64 of algorithm 50, the adjusted sales effectiveness of the advertisement is determined in step 94. The adjusted sales effectiveness is determined based on the same equation used in process step 64 of algorithm 50. Additionally, similar to step 66 of algorithm 50, the length of advertisement is determined in step 96.

Referring now to step 97, the total number of available GRPs per advertisement length is determined. The GRPs per advertisement length may be determined based on the available inventory of GRPs already purchased or available to be purchased. In step 98, the effective delivery per GRP increment, which may be equal to any number of GRPs, of the advertisement is determined. The effective delivery per GRP increment of an advertisement is the GRP increment modified by the wearout, if any, of the advertisement. The effective delivery is determined using an equation similar to the equation used in step 16 of the algorithm 10 described above in regard to FIG. 2 wherein MW is equal to the number of GRPs per GRP increment (e.g., 1 GRP).

In step 99, the media weight is optimized based on available GRPs. To do so, for each advertisement length, the total available GRPs for each advertisement length, as determined in step 97, are distributed among the advertisements in single GRP increment steps. First, the GRPs are distributed to those advertisements having a mandatory GRP allocation as determined in step 88. The GRP increments are so distributed until the advertisements have an allocation of GRPs equal to the mandatory GRP allocation. Subsequently, the selling power delivered of each advertisement is calculated based on the next GRP increment. The selling power delivered of the advertisement is a function of the adjusted sales effectiveness as determined in step 94, the effective delivery per GRP increment as determined in step 98, and the total amount of GRPs placed behind the advertisement. The incremental selling power delivered is determined using the equation described above in regard to step 76 of algorithm 50. The GRP increment is then applied to the advertisement having the largest incremental selling power delivered as calculated based on the GRP increment.

The GRP increments are so distributed until any applicable wearout factors cause the incremental selling power delivered of the advertisement to decrease to level of the incremental selling power delivered of another advertisement of the same length. The remaining GRP increments are subsequently distributed to the second advertisement of the same length until the incremental selling power delivered of the second advertisement "wears down" to the incremental selling power delivered of another advertisement of the same length. Similar to algorithm 50, the distribution process of algorithm 80 continues until all GRP increments have been distributed or all advertisements have the same incremental selling power delivered at which point the remaining GRP increments are alternately distributed. Thus, after all the GRPs have been distributed in this way, a media plan indicating the optimal allocation of the GRP inventory to maximize the total selling power is determined.

Referring now to FIGS. 5-26, there is shown an illustrative user interface application (designated with reference numeral 200) that is downloaded from the server machine 102 to the client machine 104 via the network 106 as discussed above in regard to FIG. 1. The user interface application 200 includes a menu bar 202 and a number of selection "buttons" 204-218. Each selection button may be "clicked" or otherwise selected to gain access to particular functionality of the user interface application. In particular, button 204 may be selected to determined the selling power needed based on a target level of sales or share; button 206 may be selected to determine the selling power as represented by the number of advertisements needed, the number of GRPs needed, the value of sales effectiveness required, or the amount of selling power available to reach a given business goal; button 208 may be selected to optimize media spending by total media budget or GRP inventories to deliver the maximum selling power; button 210 may be selected to forecast or project the contribution to business results (e.g., share change, volume change, volume impacted, percent of brand volume impacted, percent of category volume impacted, remaining sales effectiveness, remaining selling power, or selling power delivered) of the advertisement plan; button 212 may be selected to save and load the data supplied to the user or by the user for future recall and analysis; and button 218 may be selected to obtain additional information about the user interface application.

Figure 6:
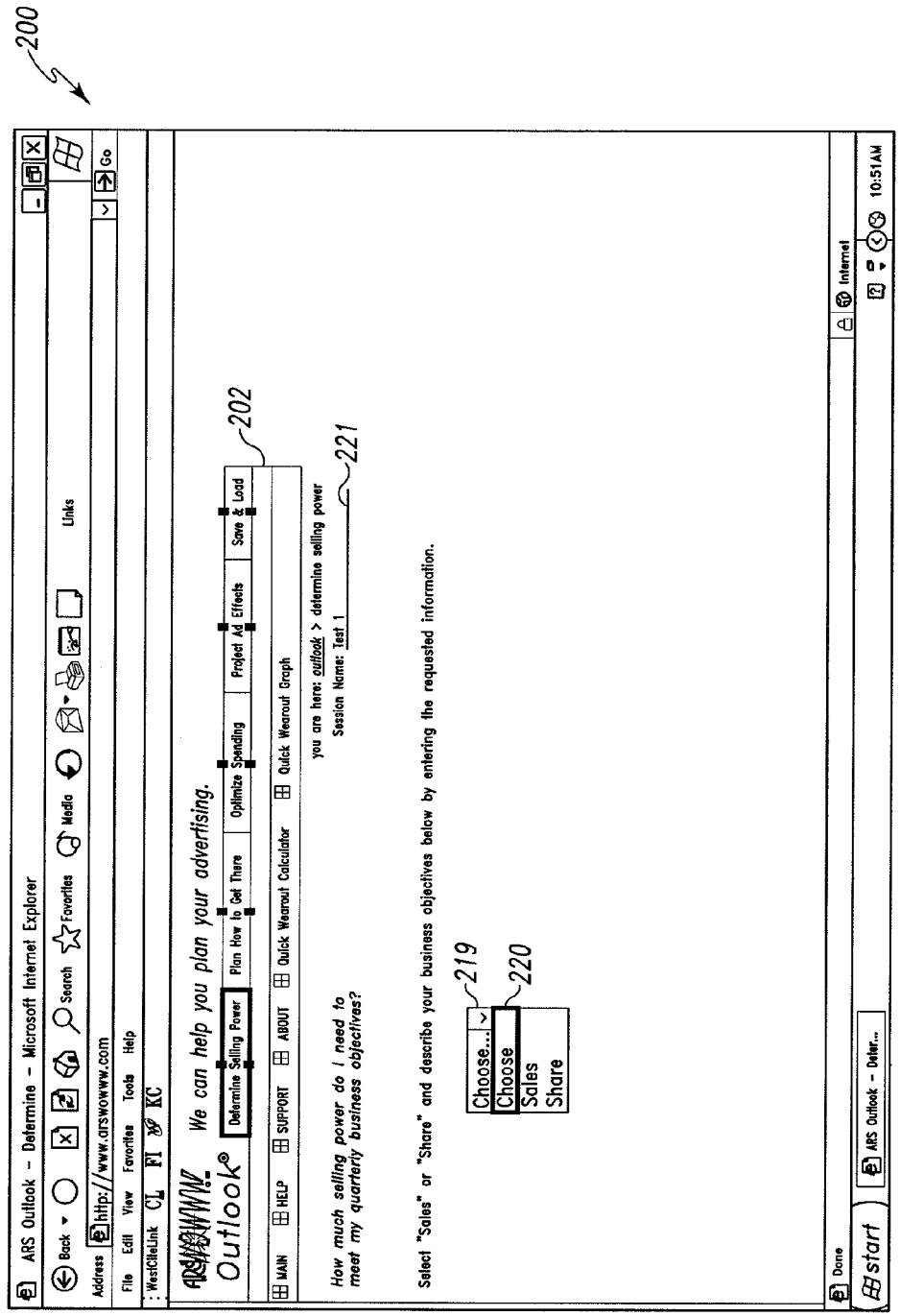
Figure 7:
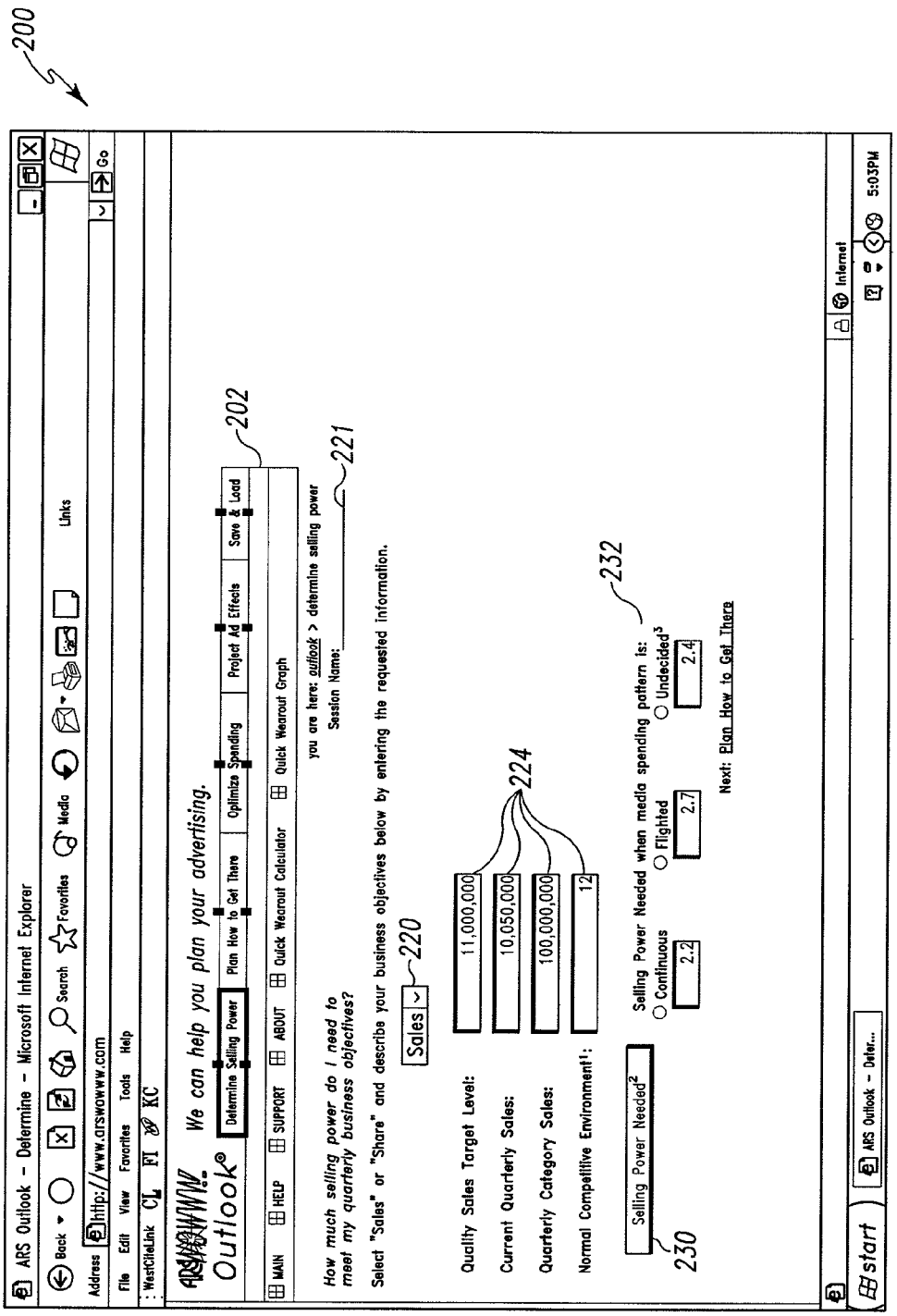
Figure 8:
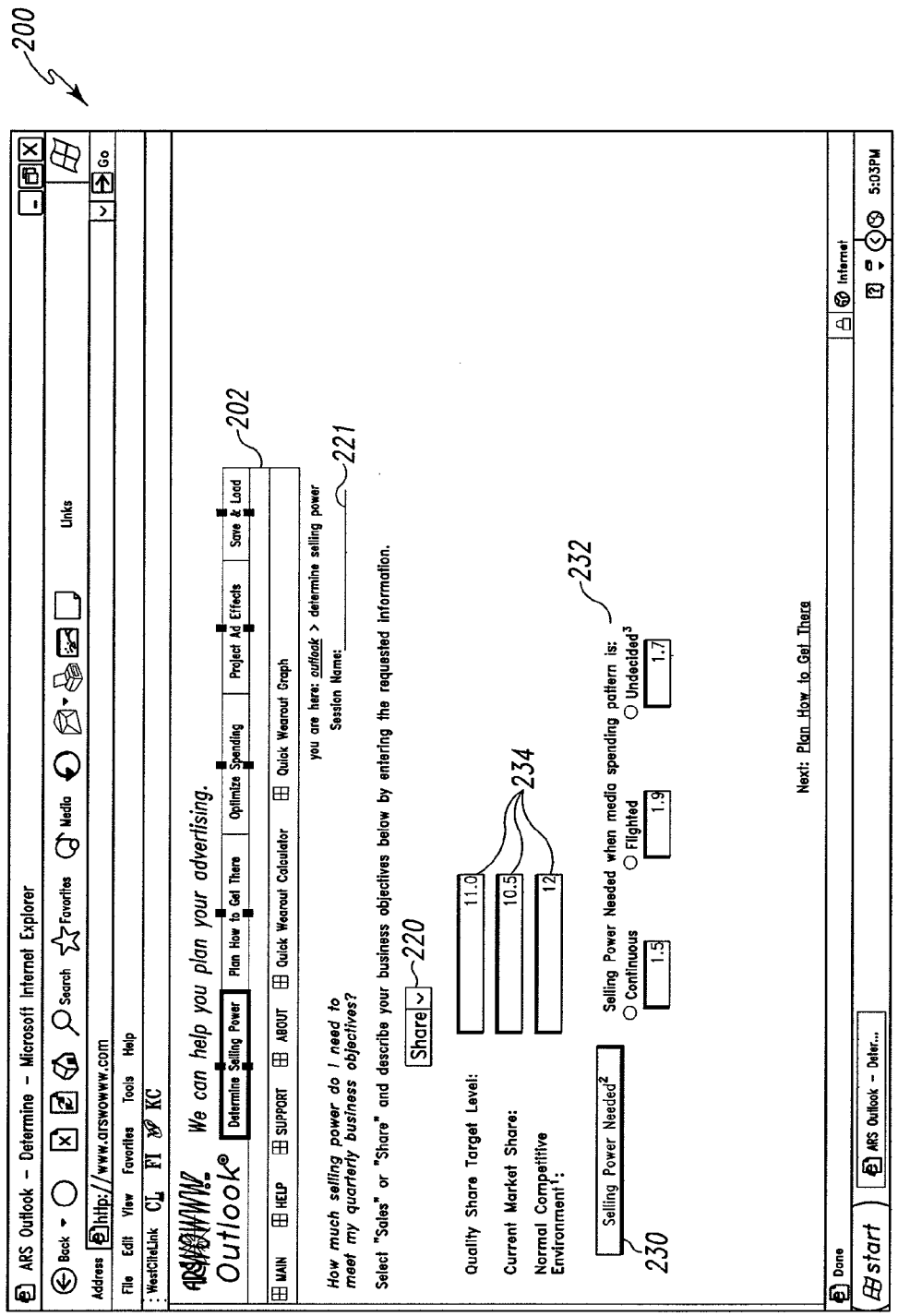
Figure 9:
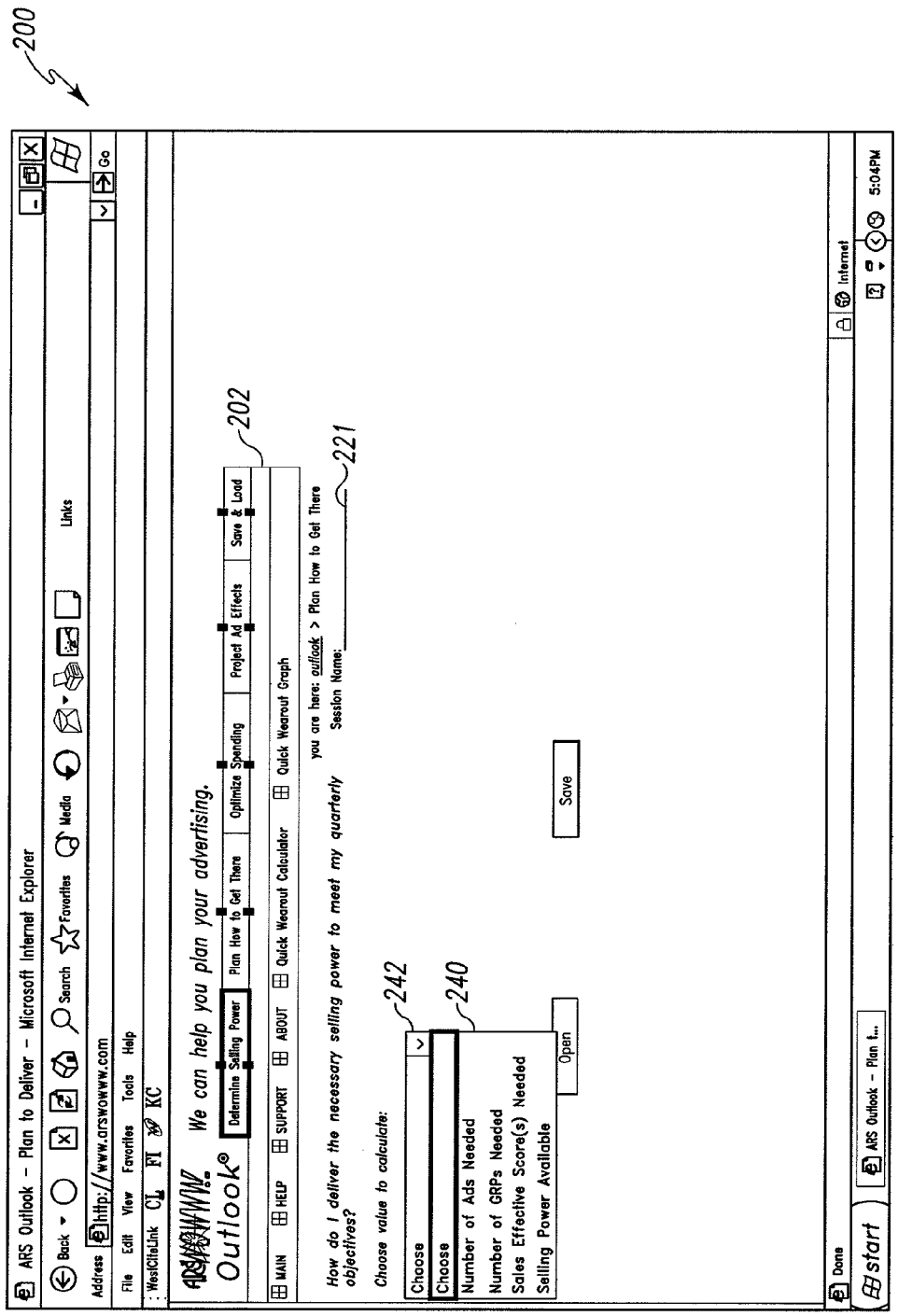

Referring now to FIGS. 6-8, if the user selects button 204 to determine the required selling power, the user is presented with a menu 220 from which the user may select a business objective for which the required selling power is to be determined. To do so, the user may select a pull-down button 219 of the menu 220 to display the possible choices. When a user selects a business objective from the menu 220, a number of additional data fields, output fields, and buttons are displayed on the user interface application 200. For example, when a user selects the "Sales" choice from menu 220, a number of data fields 224 are displayed to the user as illustrated in FIG. 7. The user may then enter the quarterly sales target level in dollar amount, the current quarterly sales level in dollar amount, the quarterly category sales level in dollar amount, and the normal competitive environment factor of the product category in the data fields 224. If the user does not know the normal competitive environment factor for the product category, a default value may be used. Illustratively, as shown in FIG. 7, the default value for the normal competitive environment factor is 12.

Once the user has entered the appropriate data in the data fields 224, the user may "click" or otherwise select button 230 to determine the selling power needed. When the user selects button 230, the user supplied data is transmitted to the network server 102. The network server 102, or other processing machine coupled to network server 102, determines the required selling power and transmits the resultant data to the client 104. An output table 232 is subsequently displayed on the user interface application 200 showing the required selling power depending on airing pattern of the advertisement plan (continuous, flighted, or undecided).

Alternatively, if the user selects the "Share" choice from menu 220, data fields 234 are displayed to the user as illustrated in FIG. 8. The user may then enter the quarterly share target level, the current quarterly sales level in dollar amount, and the normal competitive environment factor of the product category in data fields 234.

Once the user has entered the appropriate data in the data fields 234, the user may "click" or otherwise select button 230 to determine the selling power needed. When the user selects button 230, the user supplied data is transmitted to the network server 102. The network server 102, or other processing machine coupled to network server 102, determines the required selling power and transmits the resultant data to the client 104. An output table 232 is then displayed on the user interface application 200 showing the required selling power depending on airing pattern of the advertisement plan (continuous, flighted, or undecided). The user may subsequently alter or change the data entered in the data fields 234, and/or data fields 224, and select button 230 to view the change in the selling power needed.

Figure 10:
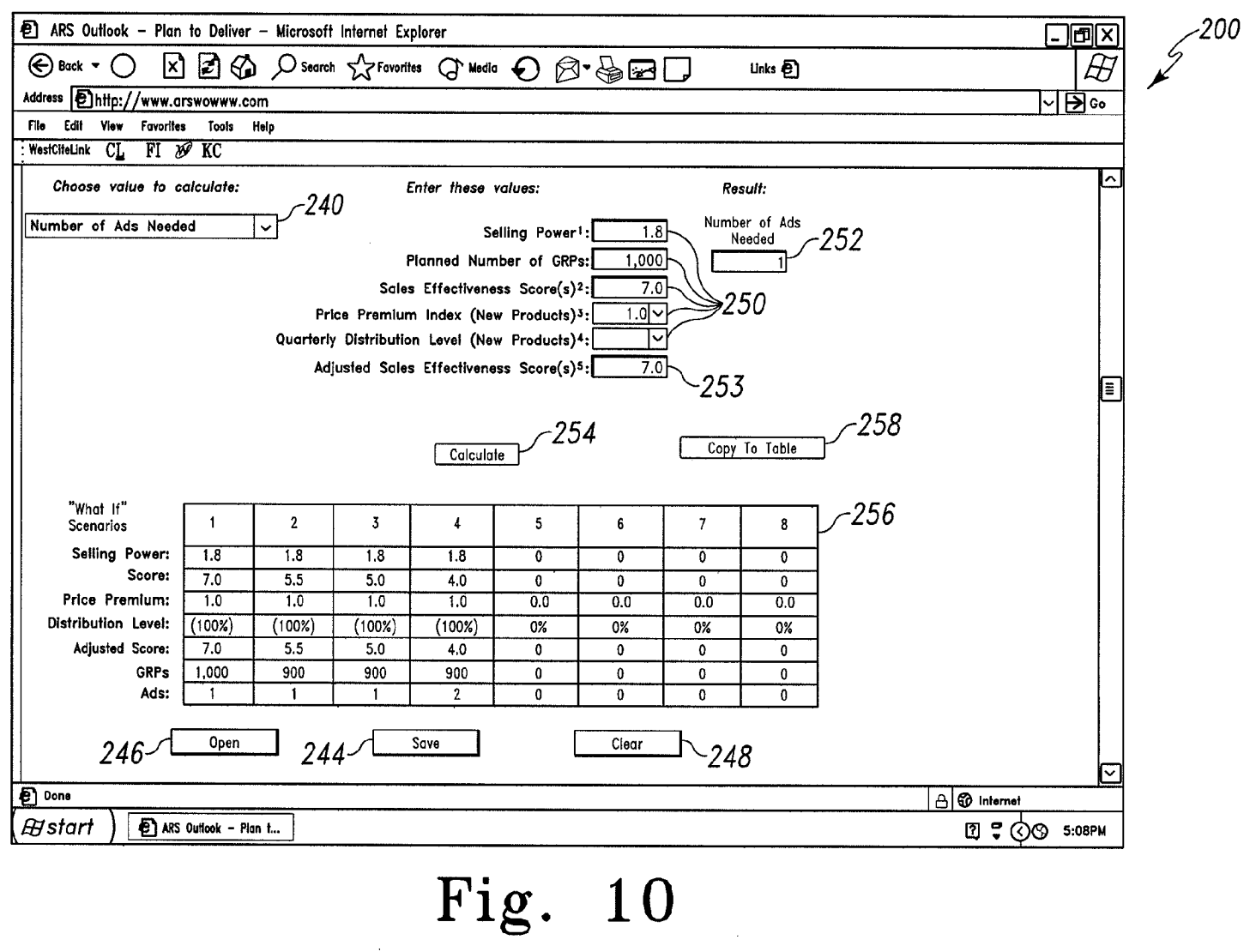

Referring now to FIGS. 9-13, if the user selects button 206 to determine the selling power required to reach a given business goal, the user is presented with a menu 240 from which the user may select the form of selling power required. To do so, the user may select a pull-down button 242 of the menu 240 to display the possible choices. When a user selects a form of selling power from the menu 240, a number of additional data fields, output fields, and buttons are displayed on the user interface application 200. For example, when a user selects the "Number of Ads Needed" choice from menu 220, a number of data fields 250, output fields 252, 253, and button 254 are displayed to the user as illustrated in FIG. 10. The user may then enter the selling power needed, the planned number of GRPs, the sales effectiveness score of the advertisement, the price premium index of the advertised product if the product is a new product, and the quarterly distribution level of the product if the product is a new product in the data fields 250. If the advertised product is not a new product, a default value may be entered in the price premium index data field and the distribution level of the product data field may be left blank. Illustratively, the default value for the price premium index is 1.

Once the user has entered the appropriate data in the data fields 250, the user may "click" or otherwise select the "Calculate" button 254 to determine the selling power needed. When the user selects button 254, the user supplied data is transmitted to the network server 102. The network server 102, or other processing machine coupled to network server 102, determines the required number of advertisements and transmits the resultant data to the client 104. The required number of advertisements is displayed in output field 252 and the adjusted sales effectiveness score, as determined based on the data entered in the data fields 250, is displayed in the output field 253. In addition, an output table 256 is displayed on the user interface application 200. The user may store the data, the determined number of advertisements, and the adjusted sales effectiveness score in the output table 256 by selecting the "Copy To Table" button 258. The user may then enter in different data in the data fields 250, select the button 254 to calculate the required number of advertisements, and subsequently store the data in the output table 256 by selecting the "Copy To Table" button 258. In this way, a user may perform a number of "what-if" scenarios with alternative data to determine the best advertisement plan.

The user may save the entered data and stored data displayed in the output table 256 by selecting the "Save" button 244. Alternatively, the user may clear the output table 256 by selecting the "Clear" button 248. If the user desires to load in saved data, the user may select the "open" button 246 to load in saved data. The saved data may be saved locally on the client 104 or on the data server 124 depending on the particular application and implementation. If the data is saved on the data server 124, the data is transferred to the client 104 when the user selects the button 246 and selects the appropriate data file.

Figure 11:
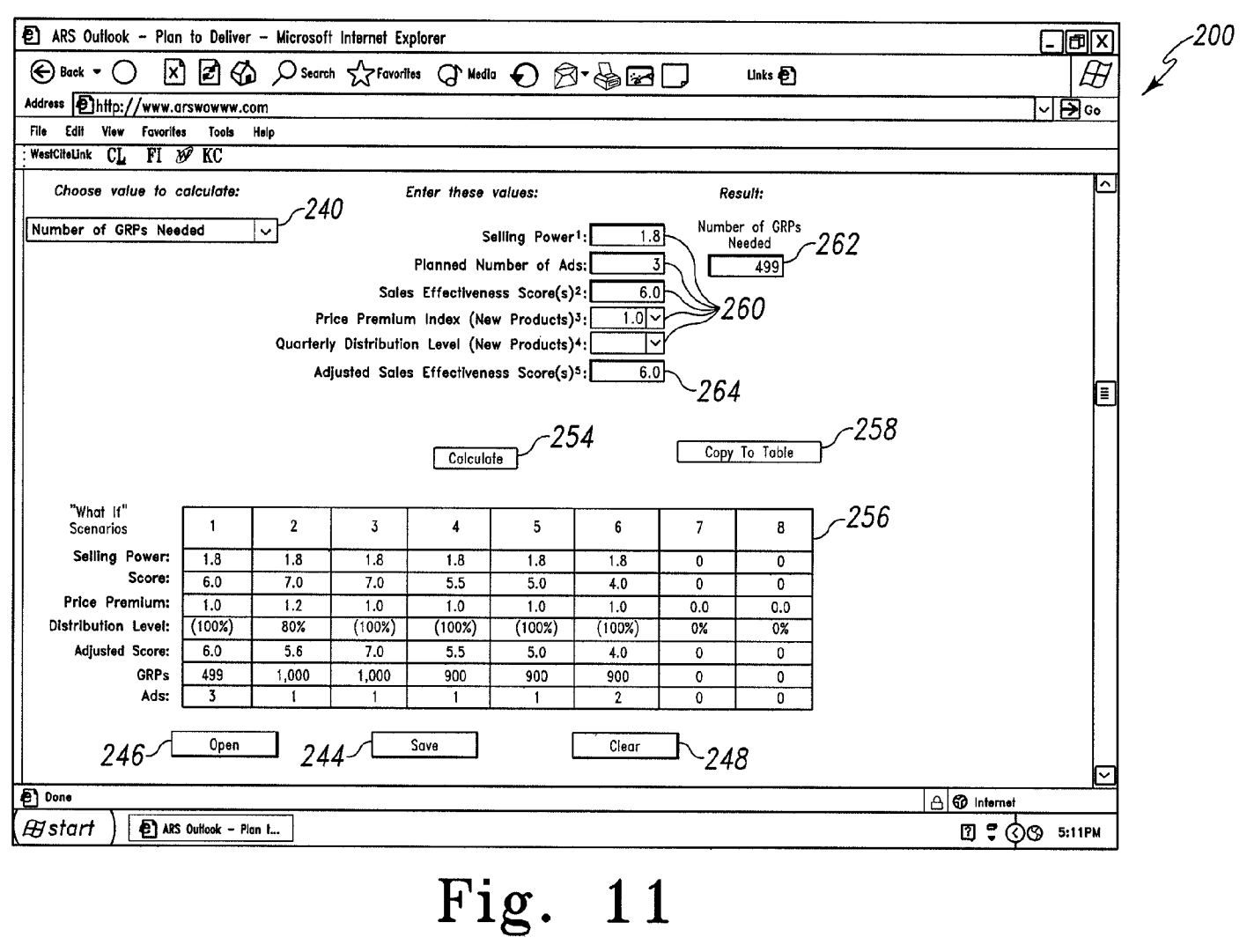

Alternatively, if the user selects the "Number of GRPs Needed" choice from menu 220, a number of data fields 260, output fields 262, 264, and button 254 are displayed to the user as illustrated in FIG. 11. The user may then enter the selling power needed, the planned number of advertisements, the sales effectiveness score of the advertisement, the price premium index of the advertised product if the product is a new product, and the quarterly distribution level of the product if the product is a new product in the data fields 260.

Once the user has entered the appropriate data in the data fields 260, the user may "click" or otherwise select the "Calculate" button 254 to determine the number of GRPs required. When the user selects button 254, the user supplied data is transmitted to the network server 102. The network server 102, or other processing machine coupled to network server 102, determines the required number of GRPs and transmits the resultant data to the client 104. The required number of GRPs is displayed in output field 262 and the adjusted sales effectiveness score, as determined based on the data entered in the data fields 260, is displayed in the output field 264. In addition, the user may select the "Copy to Table" button 258 to store the data, the determined number of advertisements, and the adjusted sales effectiveness score in the output table 256 which is displayed on the user interface application 200. The user may then perform a number of "what-if" scenarios by calculating the required GRPs based on different data and storing the resultant data in the output table 256. The user may save the data from the output table 256 by selecting button 244, clear the table 256 by selecting button 248, or load saved data by selecting button 246 as discussed above in regard to FIG. 10.

Figure 12:
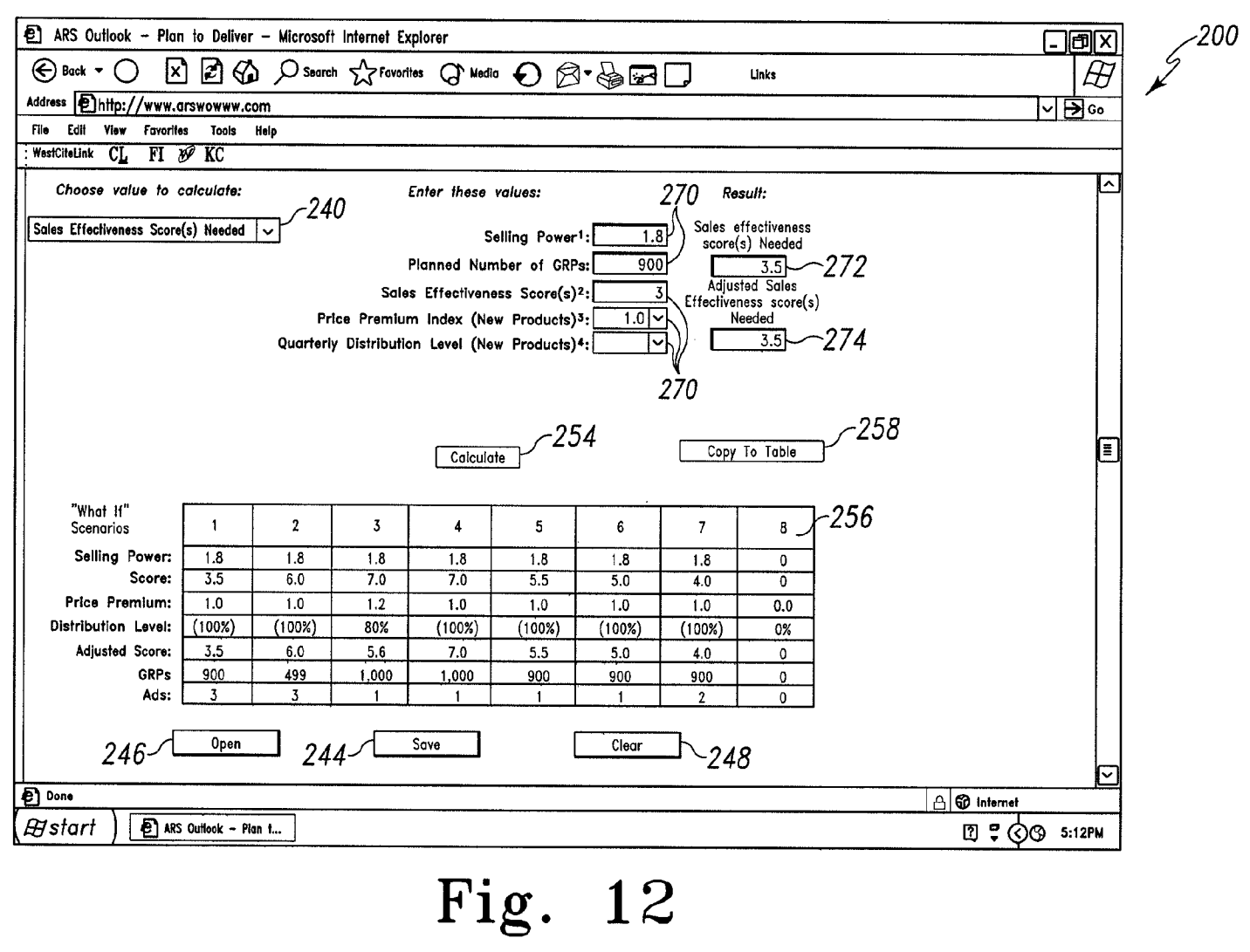

However, if the user selects the "Sales Effectiveness Score Needed" choice from menu 220, a number of data fields 270 and button 254 are displayed to the user as illustrated in FIG. 12. The user may then enter the selling power needed, the planned number of GRPs, the planned number of advertisements, the price premium index of the advertised product if the product is a new product, and the quarterly distribution level of the product if the product is a new product in the data fields 270.

Once the user has entered the appropriate data in the data fields 270, the user may "click" or otherwise select the "Calculate" button 254 to determine the sales effectiveness score required. When the user selects button 254, the user supplied data is transmitted to the network server 102. The network server 102, or other processing machine coupled to network server 102, determines the required sales effectiveness score and transmits the resultant data to the client 104. The required sales effectiveness score is displayed in output field 272 and the adjusted sales effectiveness score, as determined based on the required sales effectiveness and the data entered in the data fields 270, is displayed in the output field 274. In addition, the user may select the "Copy To Table" button 258 to store the data in the output table 256 which is displayed on the user interface application 200. The user may then perform a number of "what-if" scenarios by calculating the required sales effectiveness score based on different data and storing the resultant data in the output table 256. The user may save the data from the output table 256 by selecting button 244, clear the table 256 by selecting button 248, or load saved data by selecting button 246 as discussed above in regard to FIG. 10.

Figure 13:
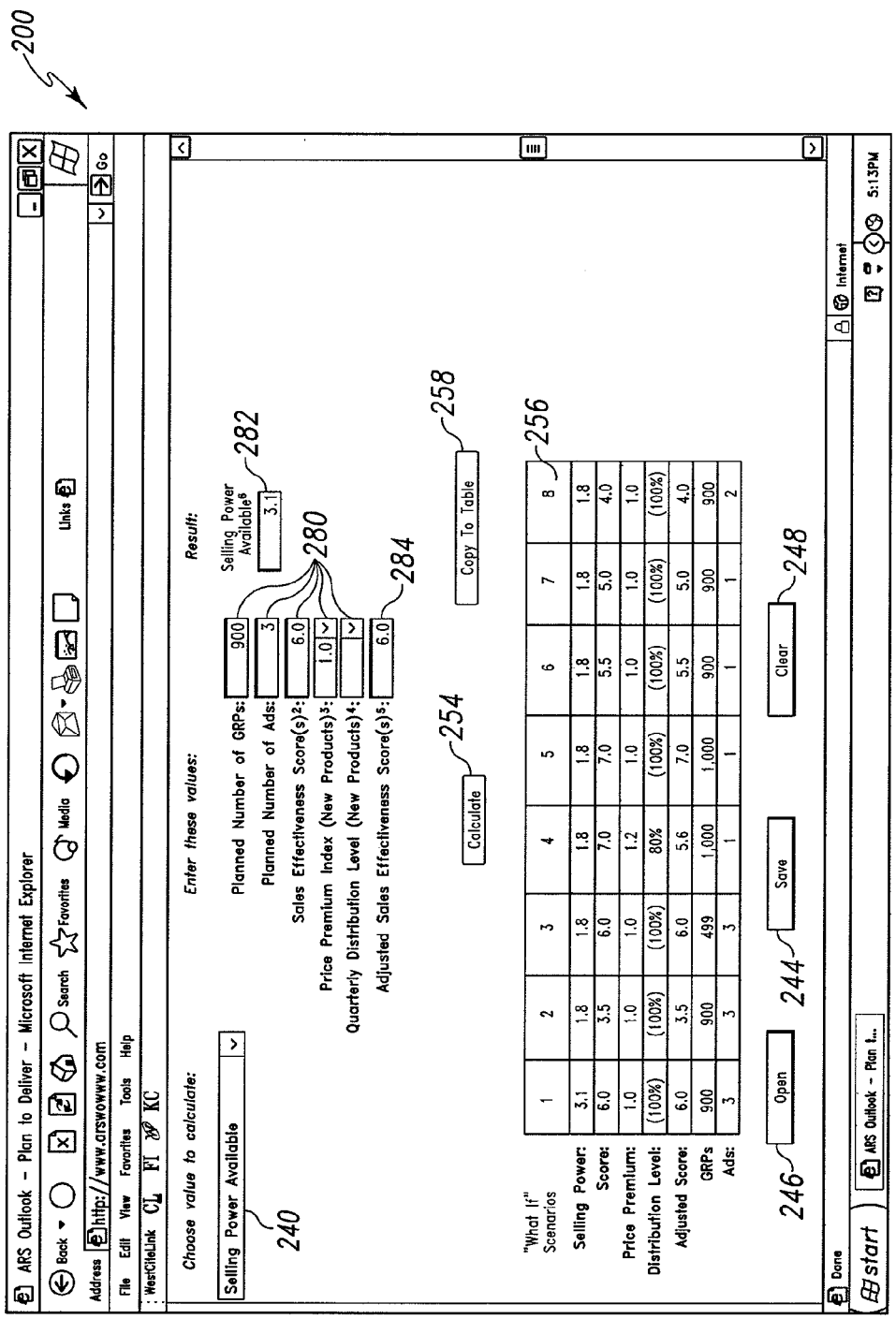

Alternatively, if the user selects the "Selling Power Available" choice from menu 220, a number of data fields 280 and button 254 are displayed to the user as illustrated in FIG. 13. The user may then enter the planned number of GRPs, the planned number of advertisements, the sales effectiveness score of the advertisement, the price premium index of the advertised product if the product is a new product, and the quarterly distribution level of the product if the product is a new product in the data fields 280.

Once the user has entered the appropriate data in the data fields 280, the user may "click" or otherwise select the "Calculate" button 254 to determine the available selling power. When the user selects button 254, the user supplied data is transmitted to the network server 102. The network server 102, or other processing machine coupled to network server 102, determines the available selling power and transmits the resultant data to the client 104. The available selling power is displayed in output field 282 and the adjusted sales effectiveness score, as determined based on the data entered in the data fields 280, is displayed in the output field 284. In addition, the user may select the "Copy To Table" button 258 to store the data in the output table 256 which is displayed on the user interface application 200. The user may then perform a number of "what-if" scenarios by calculating the available selling power based on different data and storing the resultant data in the output table 256. The user may save the data from the output table 256 by selecting button 244, clear the table 256 by selecting button 248, or load saved data by selecting button 246 as discussed above in regard to FIG. 10.

Figure 14:
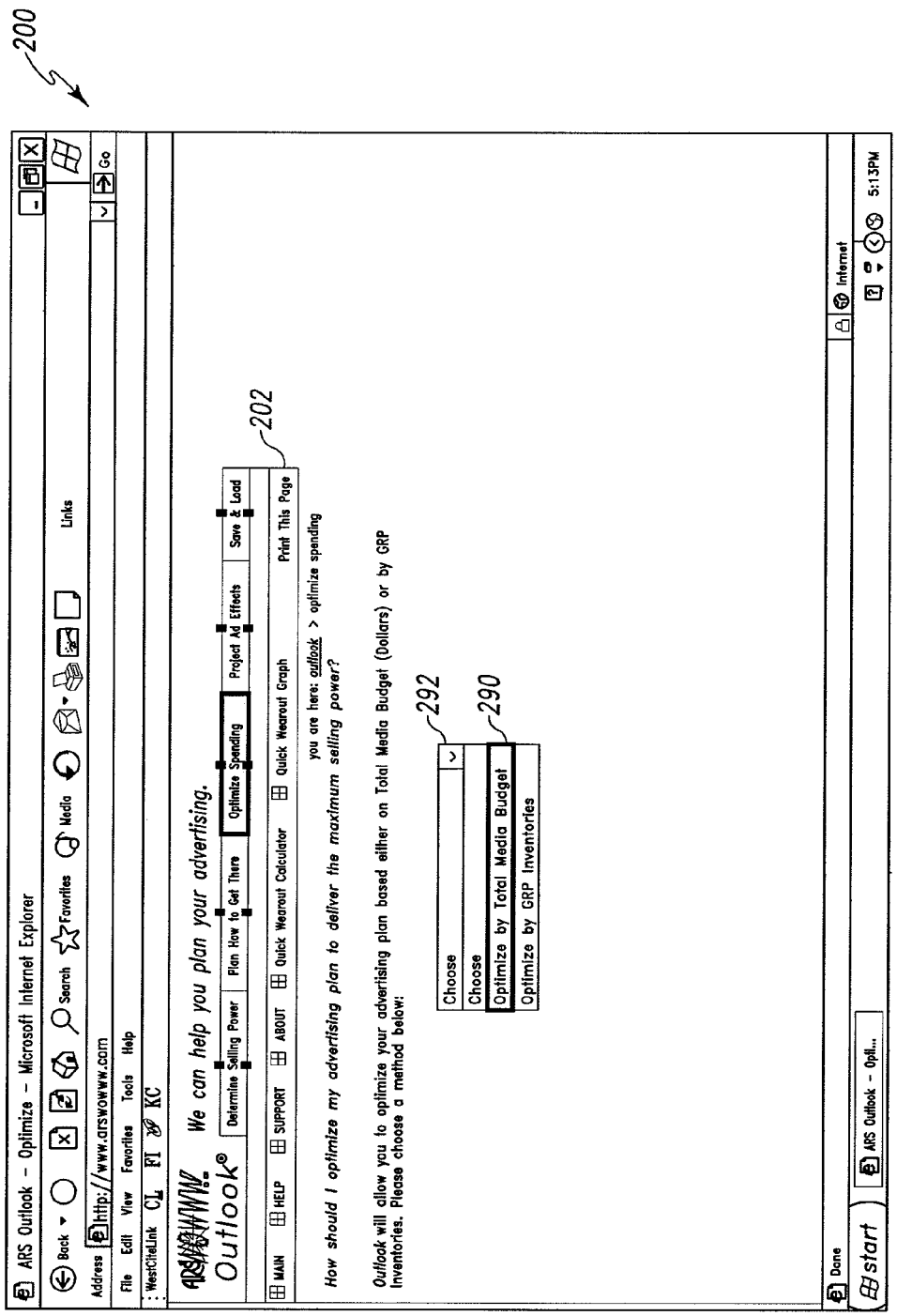
Figure 15:
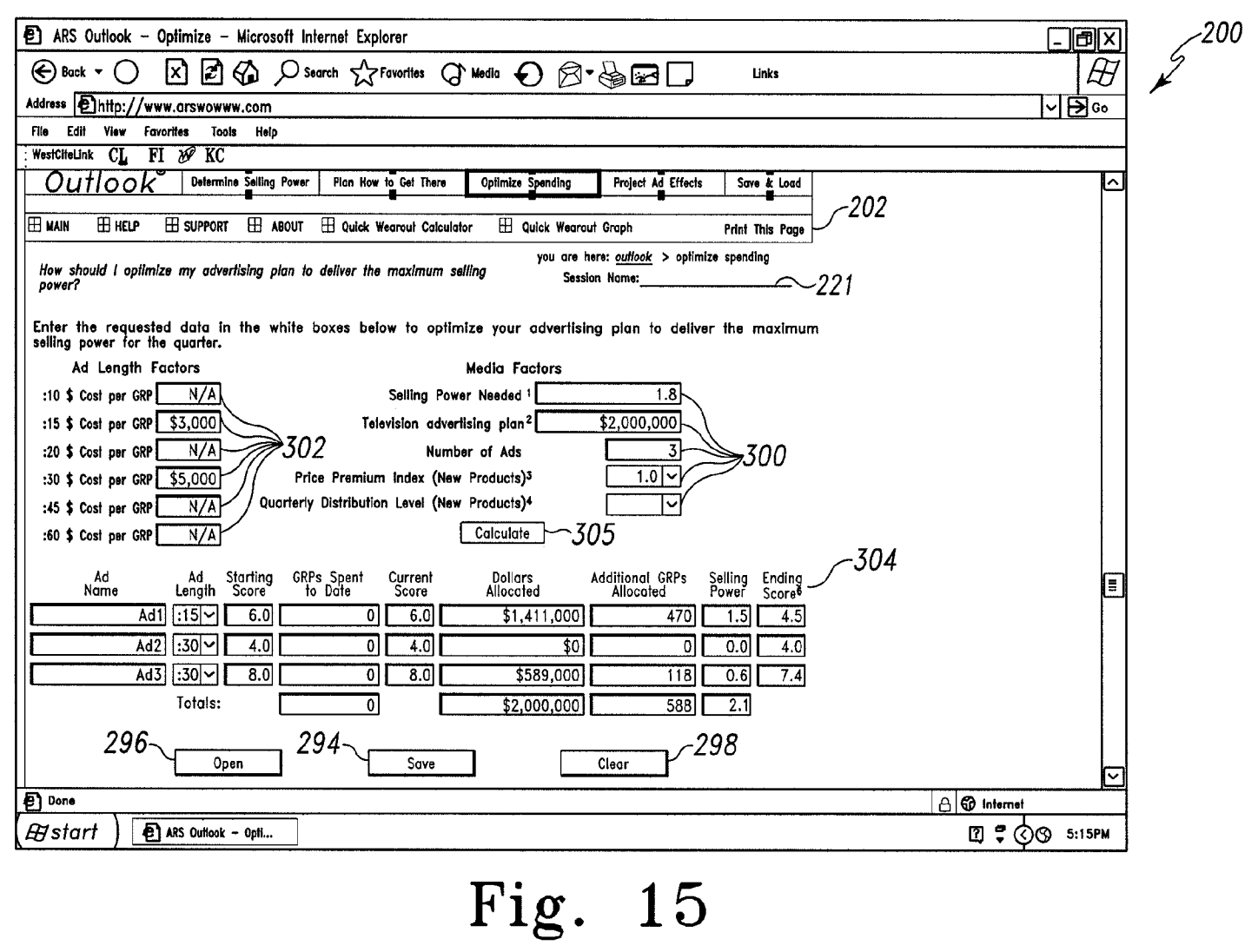
Figure 16:
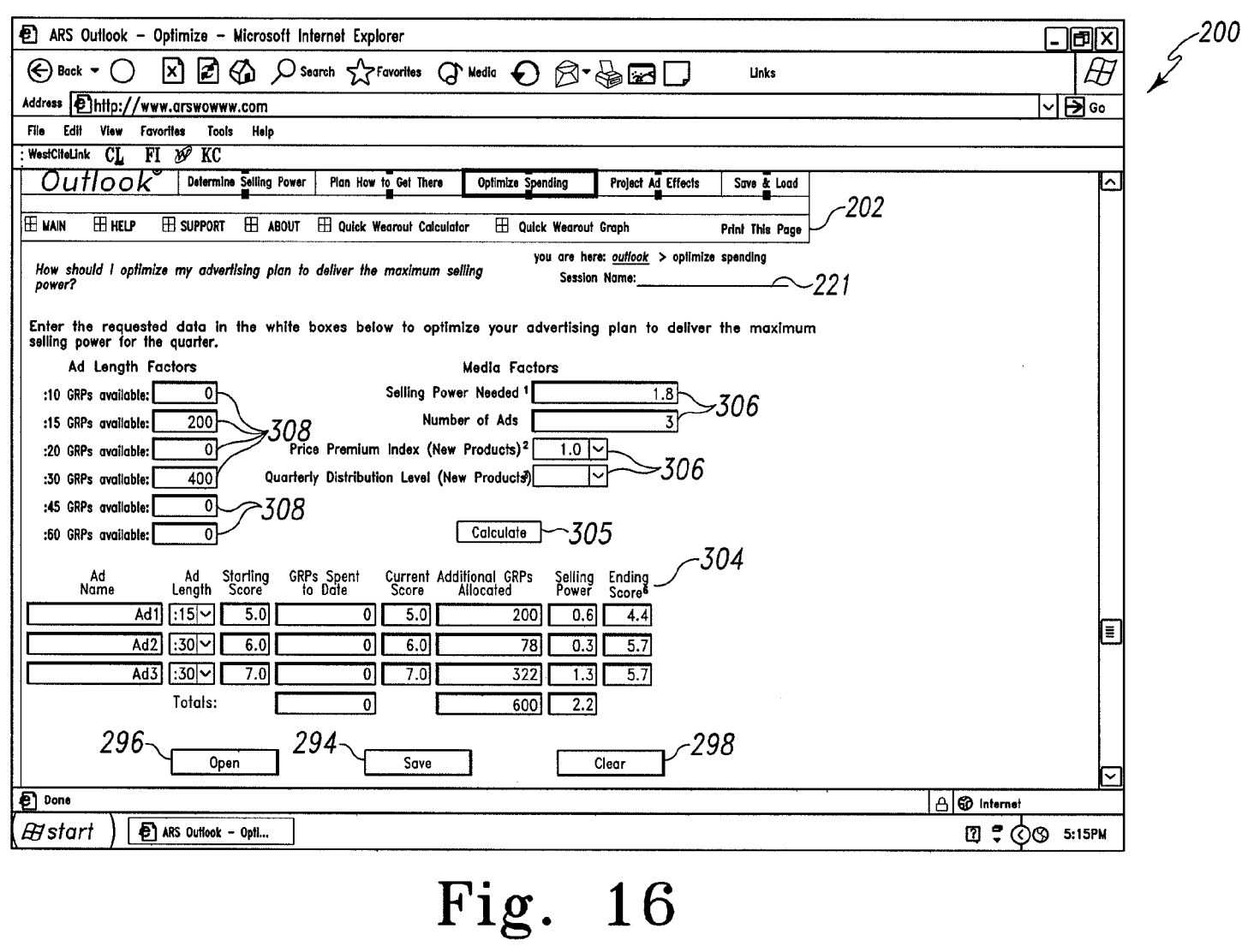
Figure 17:
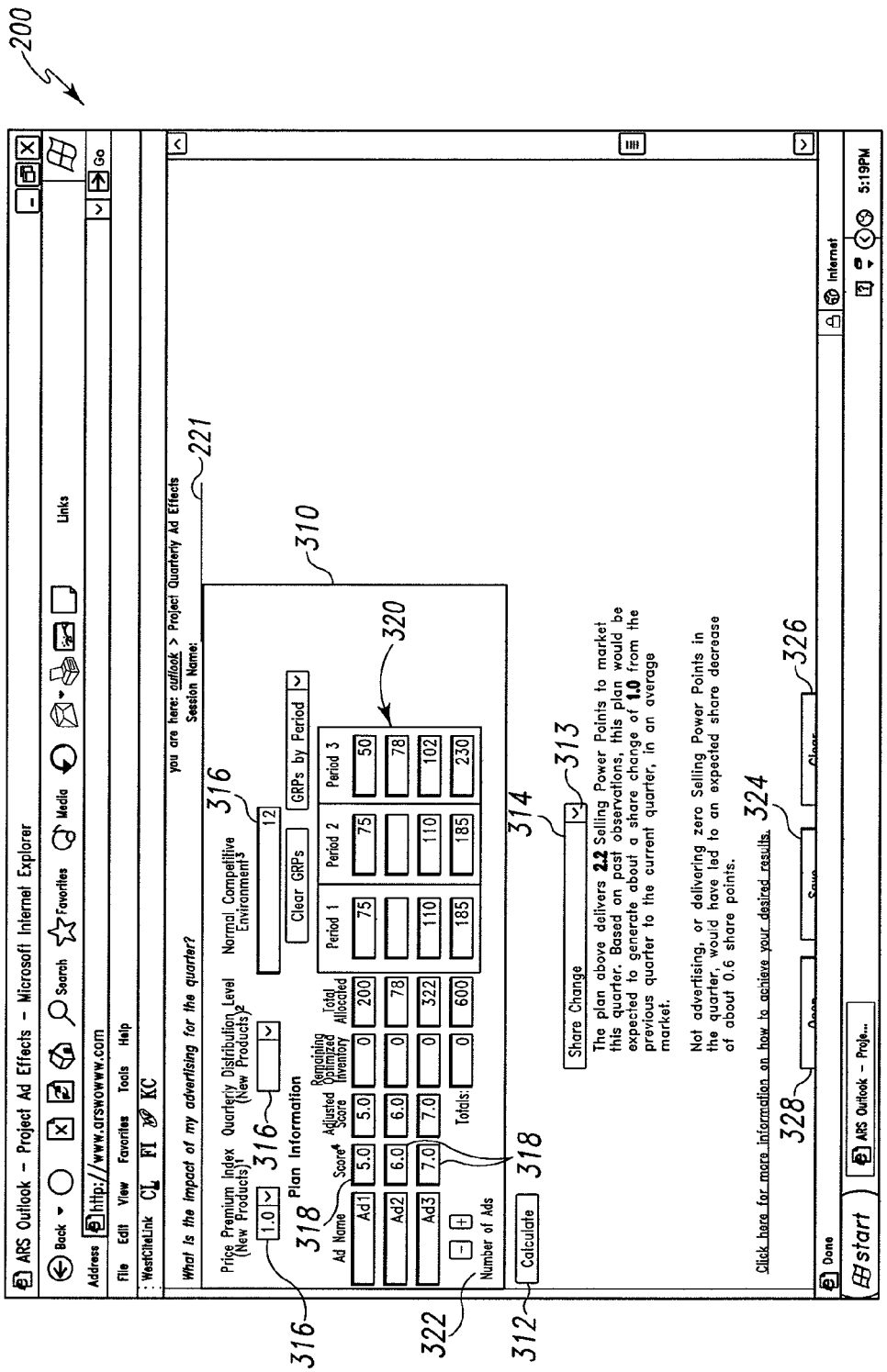

Referring now to FIGS. 14-16, if the user selects button 208 to optimize media spending so as to deliver the maximum selling power, the user is presented with a menu 290 from which the user may select to optimize media spending by total media budget or by GRP inventories. To do so, the user may select a pull-down button 292 of the menu 290 to display the possible choices. When the user makes a selection from menu 290, a number of additional data fields, output fields, and buttons are displayed on the user interface application 200. For example, when a user selects the "Optimize by Total Media Budget" choice from menu 290, a number of data fields 300, 302, and button 305 are displayed to the user as illustrated in FIG. 15. The user may then enter the selling power needed, the total amount of the media budget in dollars, the number of advertisements, the price premium index of the advertised product if the product is a new product, and the quarterly distribution level of the product if the product is a new product in the data fields 300. If the advertised product is not a new product, a default value may be entered in the price premium index data field and the distribution level of the product data field may be left blank. Illustratively, the default value for the price premium index is 1.0. In addition, the cost per GRP for each advertisement length may be entered in data fields 302. The costs entered in the data fields 302 may be actual or estimated costs. If a particular advertisement length is not used, the data field may be left blank or a null value such as "N/A" may be entered.

Once the user has entered the appropriate data in the data fields 300, 302, the user may "click" or otherwise select the "Calculate" button 305 to determine the optimized spending to maximize spelling power. When the user selects button 305, the user supplied data is transmitted to the network server 102. The network server 102, or other processing machine coupled to network server 102, determines the optimized spending by use of an optimization algorithm, such as algorithm 50 discussed above in regard to FIG. 3, and transmits the resultant data to the client 104. The optimized spending pattern by advertisement dollars is displayed in output table 304. In addition, the GRPs allocated based on the media spending behind each advertisement, the selling power delivered, and the remaining adjusted sales effectiveness score of the advertisements after the optimized advertisement plan are displayed in the output table 304. The user may save the data from the output table 305 by selecting button 294, clear the output table 305 by selecting button 298, or load saved data by selecting button 296 as discussed above in regard to FIG. 10.

Alternatively, if the user selects the "Optimize by GRP Inventories" choice from menu 220, a number of data fields 306, 308, and button 305 are displayed to the user as illustrated in FIG. 16. The user may then enter the selling power needed, the number of advertisements, the price premium index of the advertised product if the product is a new product, and the quarterly distribution level of the product if the product is a new product in the data fields 306. In addition, the number of GRPs available may be entered in data fields 308. The number of GRPs available entered in the data fields 308 may be actual or estimated. If a particular advertisement length is not used, the data field may be left blank or a "0" may be entered.

Once the user has entered the appropriate data in the data fields 306, 308, the user may "click" or otherwise select the "Calculate" button 305 to determine the optimized spending to maximize selling power. When the user selects button 305, the user supplied data is transmitted to the network server 102. The network server 102, or other processing machine coupled to network server 102, determines the optimized spending by use of an optimization algorithm, such as algorithm 80 discussed above in regard to FIG. 4, and transmits the resultant data to the client 104. The optimized spending pattern by allocated GRPs is displayed in output table 304. In addition, the selling power delivered and the remaining adjusted sales effectiveness score of the advertisements after the optimized advertisement plan are displayed in the output table 304. The user may save the data from the output table 304 by selecting button 294, clear the output table 304 by selecting button 298, or load saved data by selecting button 296 as discussed above in regard to FIG. 10.

Referring now to FIGS. 17-25, if the user selects button 210 (see FIG. 5) to forecast or project the contribution to business results of the advertisement plan, the user is presented with a data table 310, a calculation button 312, and a business metric menu 314. The data table 310 includes a number of input data fields 316, 318, 320. The user may enter the normal competitive environment factor, the price premium index of the advertised product if the product is a new product, and the quarterly distribution level of the product if the product is a new product in the data fields 316. The user may also enter the sales effectiveness score for each advertisement in the data fields 318. In addition, the user may distribute the available GRPs across the advertisements and advertising periods (e.g., quarterly). If the user wants to add more advertisements or deduct advertisements from the advertisement plan, the user may select the appropriate button from the "Number of Ads" menu 322 of the data table 310.

Once the user has entered the appropriate data in the data fields 316, 318, 320, the user may "click" or otherwise select the "Calculate" button 312 to forecast or project the contribution to business results of the advertisement plan. When the user selects button 312, the user supplied data is transmitted to the network server 102. The network server 102, or other processing machine coupled to network server 102, determines the future contribution to business results of the advertisement plan by use of a forecasting algorithm, such as algorithm 10 discussed above in regard to FIG. 2, and transmits the resultant data to the client 104. The forecasted business result metric is displayed below the menu 314. The user may save the data entered in the data table 310 by selecting a save button 324, clear the input fields of the data table 310 by selecting a clear button 326, or load saved data by selecting an open button 328 as discussed above in regard to FIG. 10.

Figure 18:
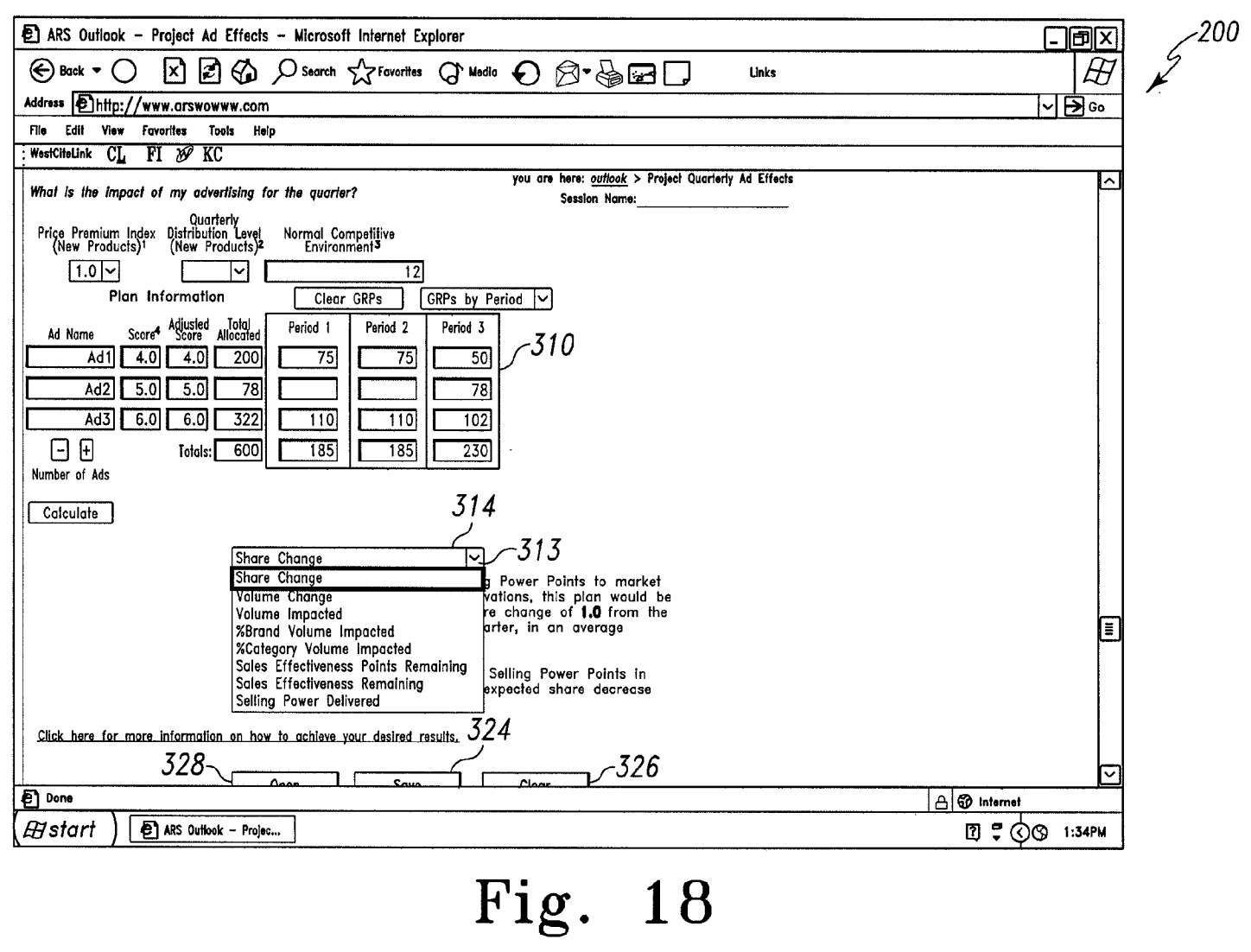
Figure 19:
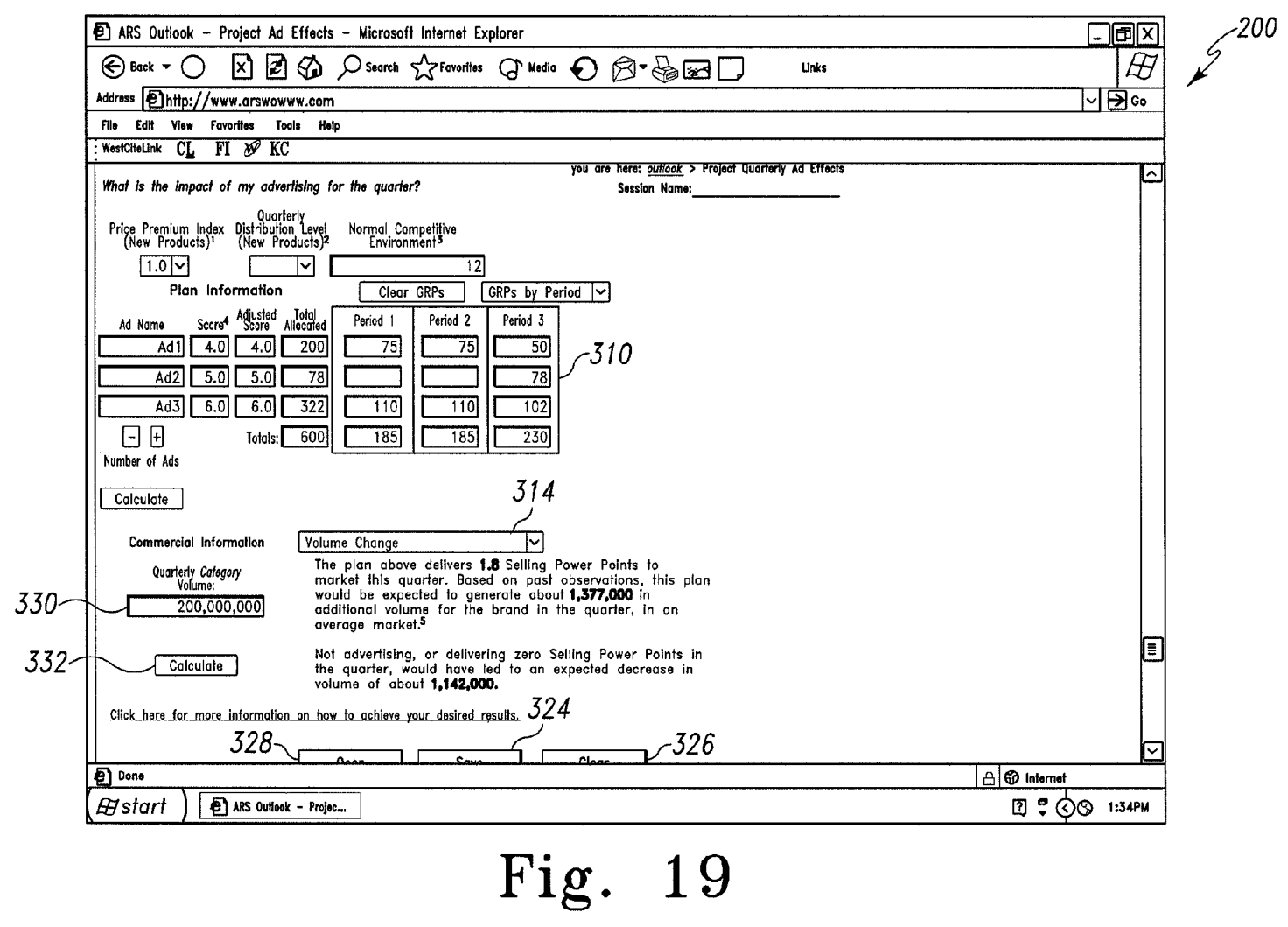

By default, the share change attributable to the advertisement plan is determined and displayed below the menu 314. However, the user may also select other business metrics to forecast. To do so, the user may select a pull-down button 313 of the menu 314 to display the possible choices as illustrated in FIG. 18. When the user makes a selection from menu 314, a number of additional data fields and outputs are displayed on the user interface 200 below the menu 314. For example, when a user selects the "Volume Change" business metric from the menu 314, a number of data field 330 and a calculate button 332 are displayed to the user as illustrated in FIG. 19. The user may then enter the quarterly category volume in any one of a number of volume metrics such as dollars, product units, weight, or other volume metric in the data field 330. The user may then "click" or otherwise select the "Calculate" button 332 to forecast or project the change in product volume attributable to the advertisement plan. When the user selects button 332, the user supplied data is transmitted to the network server 102. The network server 102, or other processing machine coupled to network server 102, forecasts the change in product volume attributable to the advertisement plan by use of a forecasting algorithm, such as algorithm 10 discussed above in regard to FIG. 2, and transmits the resultant data to the client 104. The change in category volume is then displayed below the menu 314. The user may subsequently repeat the forecasting process by entering in different data into the data fields of the data table 310 or data field 330 and selecting the "Calculate" button 332. The user may save the data entered in the data table 310 by selecting a save button 324, clear the input fields of the data table 310 by selecting a clear button 326, or load saved data by selecting an open button 328 as discussed above in regard to FIG. 10.

Alternatively, the user may select another business metric from menu 314. When a user selects a business metric and enters in any required additional data, the business metric is transmitted to and calculated (i.e., forecasted) by the network server 102, or other processing machine coupled to network server 102 as discussed above in regard to FIG. 19. The network server 102 or other processing machine utilizes a forecasting algorithm, such as the algorithm 10 discussed above in regard to FIG. 2, to forecast the selected business metric (i.e., determine the future contribution to business results of the advertisement plan as measured by the selected business metric).

Figure 20:
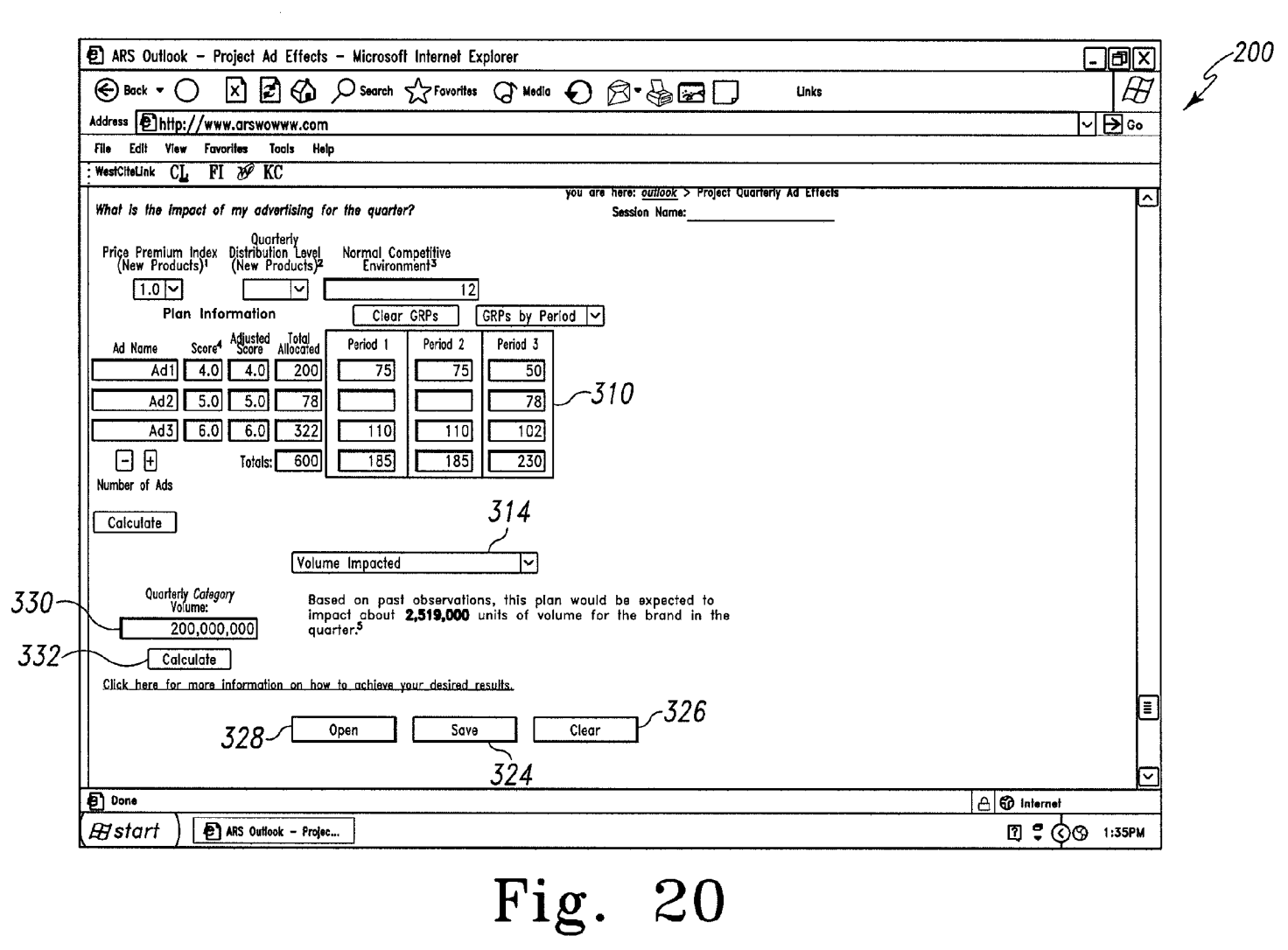
Figure 21:
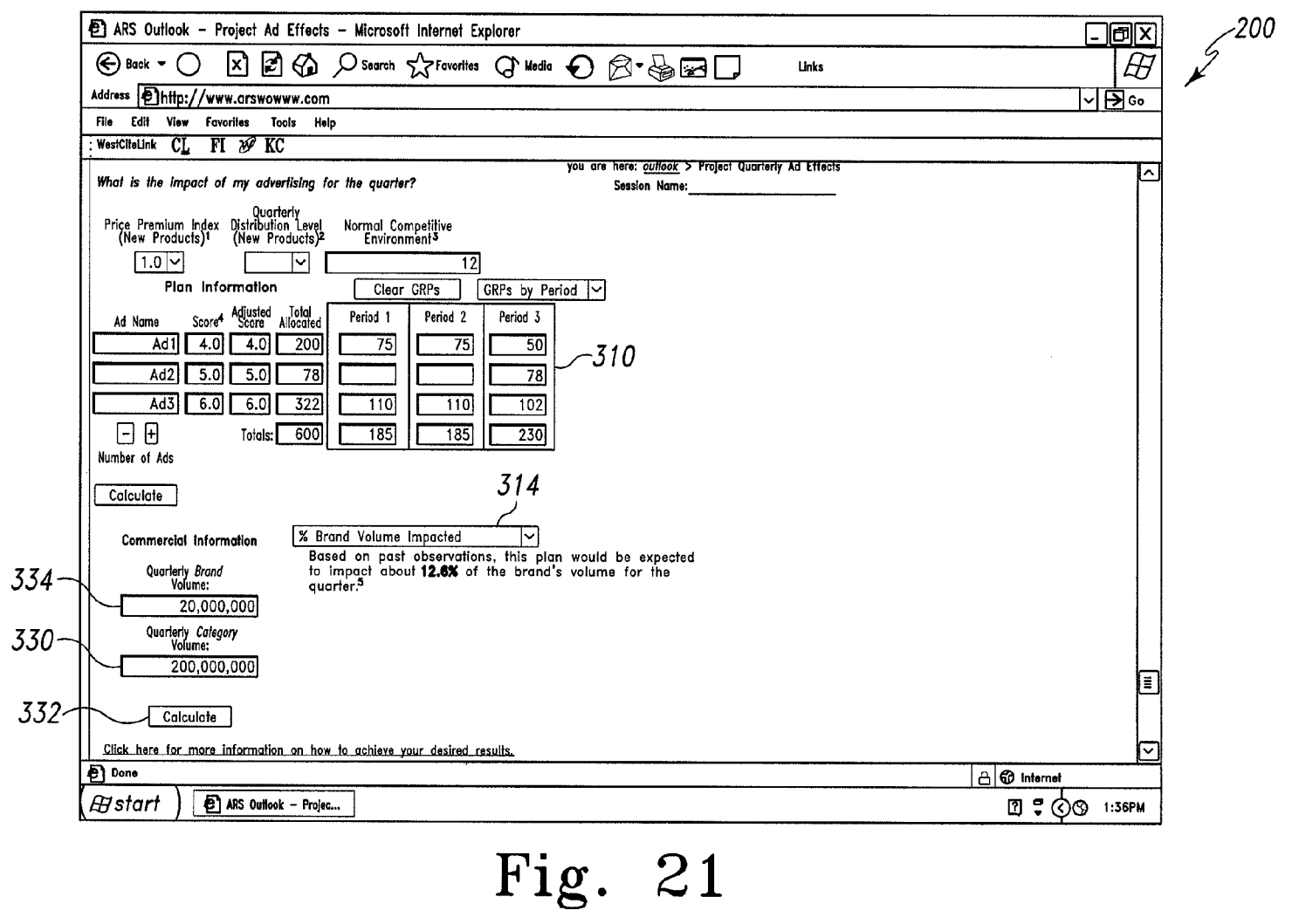
Figure 22:
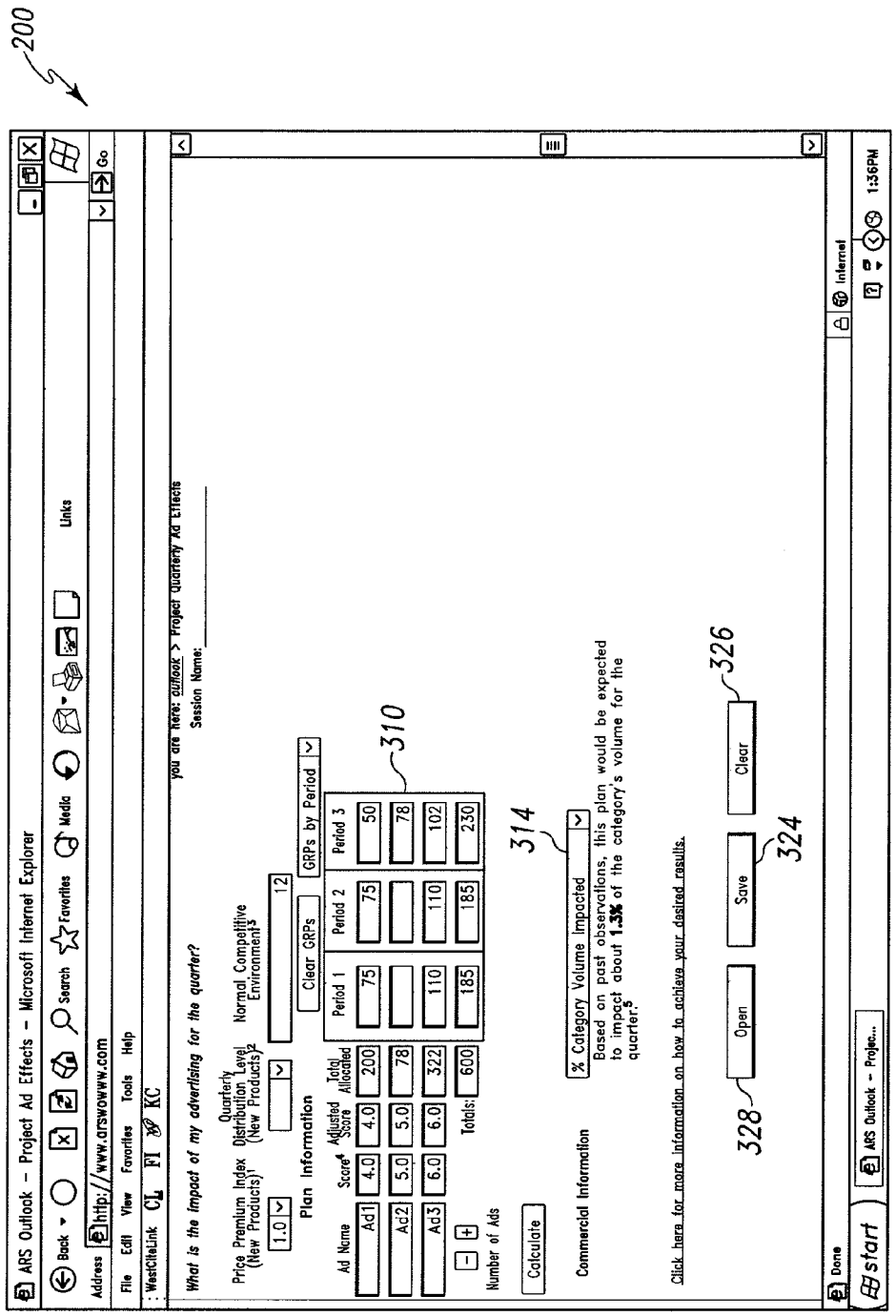

For example, as illustrated in FIG. 20, the user may select the "Volume Impacted" business metric from menu 314. If so, the user may enter the quarterly category volume in data field 330 and select the button 332 to receive a forecast or project the volume impacted attributable to the advertisement plan displayed below menu 314. The user may also select the "% Brand Volume Impacted" business metric from menu 314 and enter the quarterly brand volume in a data field 334 and the quarterly category volume in data field 330 to forecast the percent of the brand volume impacted. The calculated percent of the brand volume impacted is displayed below menu 314 as illustrated in FIG. 21. Additionally, the user may select the "% Category Volume Impacted" business metric from menu 314. If so, the percent of category volume impacted due to the advertisement plan is calculated and displayed to the user below the menu 314 as illustrated in FIG. 22.

Figure 23:
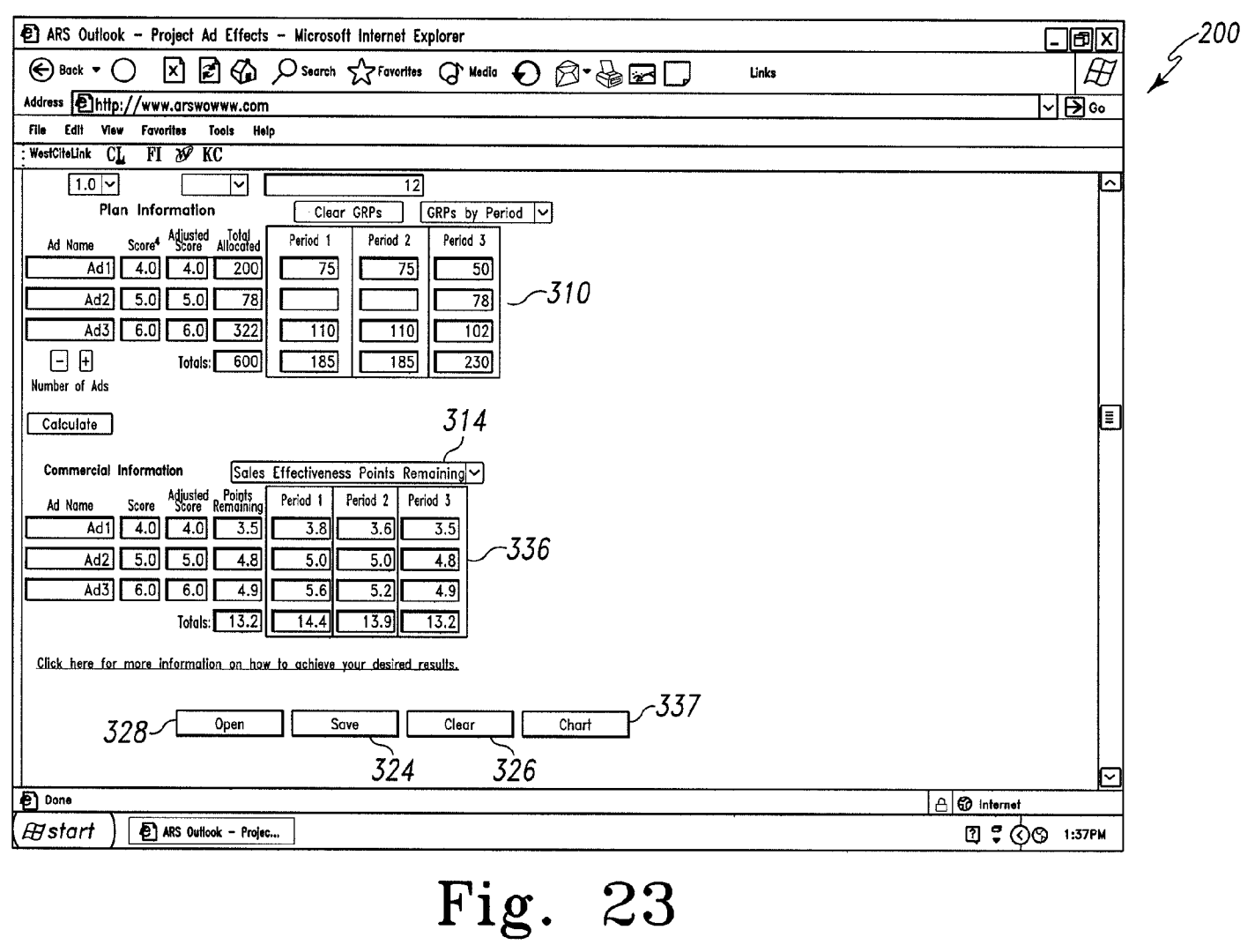
Figure 24:
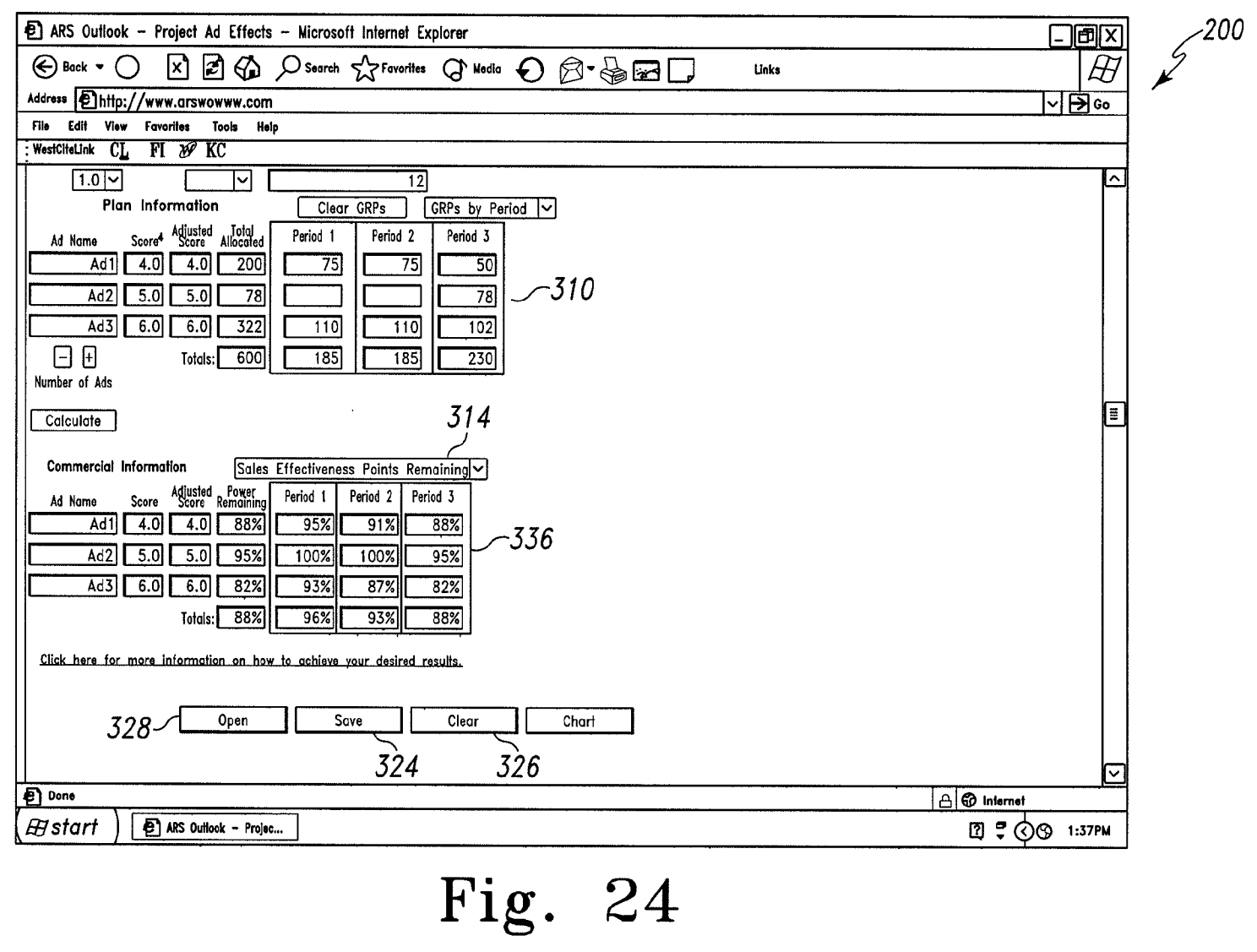
Figure 25:
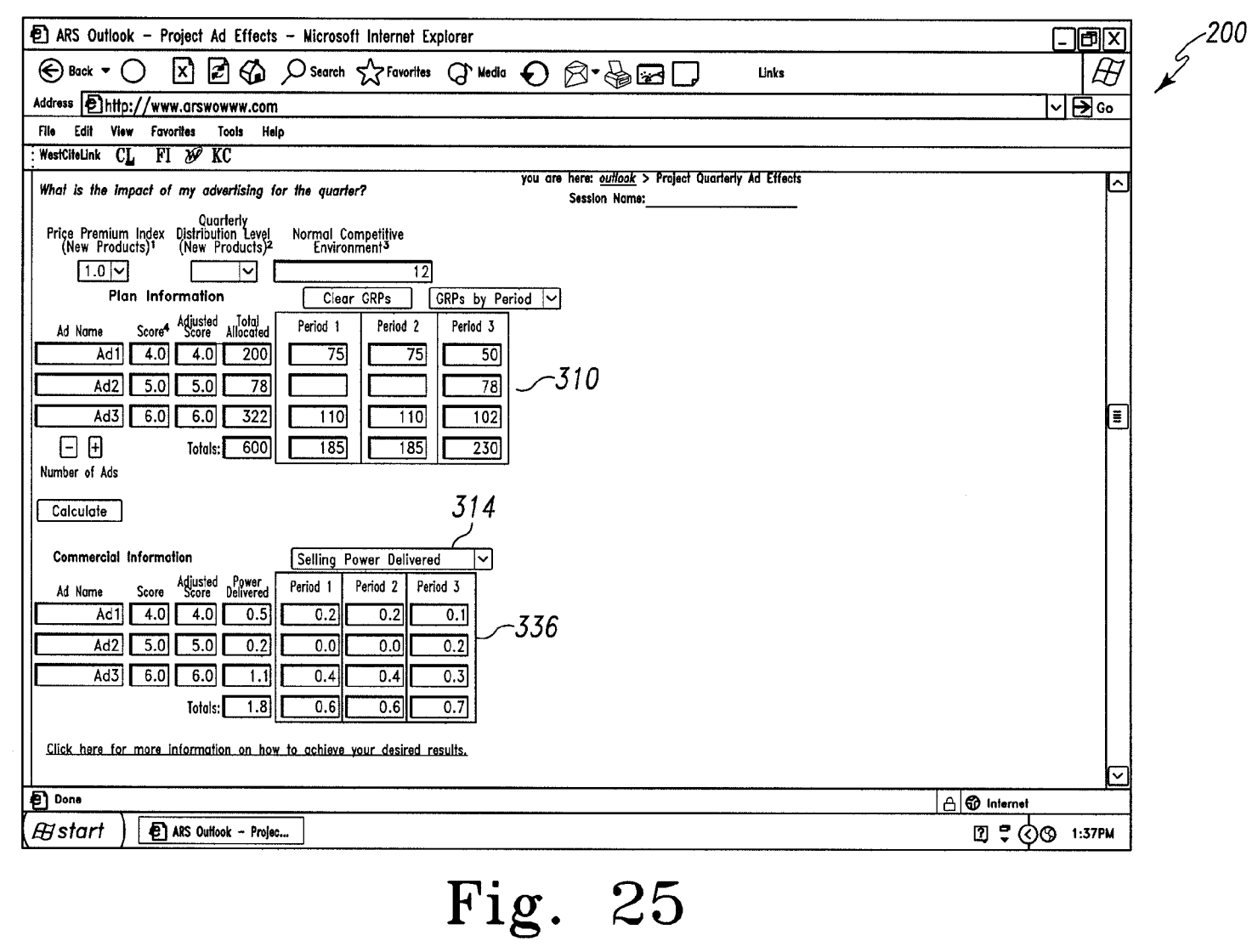

Alternatively, the user may select the "Sales Effectiveness Points Remaining", the "Sales Effectiveness Remaining", or the "Selling Power Delivered" metric from menu 314. If so, a data table 336 is displayed below the menu 314. The remaining sales effectiveness points, the remaining sales effectiveness, or the selling power delivered of the advertisements, depending on the user's selection from the menu 314, is calculated (i.e., forecasted) and presented to the user in the data table 336 as illustrated in FIGS. 23, 24, and 25, respectively. The user may save the data entered in the data table 310 and calculated in table 336 by selecting a save button 324, clear the input fields of the data table 310 and data table 336 by selecting a clear button 326, or load saved data by selecting an open button 328 as discussed above in regard to FIG. 10. The user may also display the results of data table 336 by selecting a chart button 337.

Figure 26:
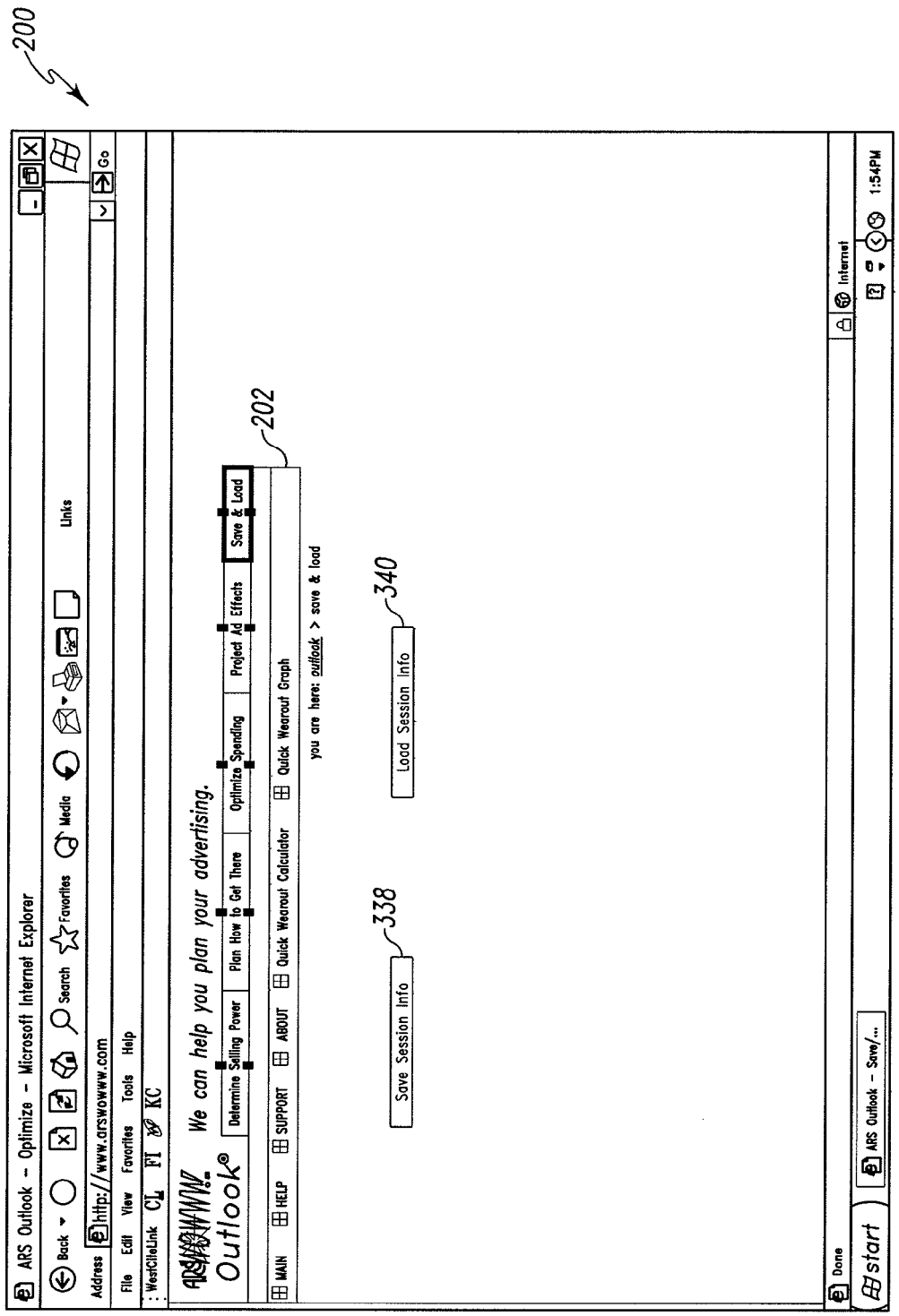

Referring now to FIG. 26, if the user selects button 212 (see FIG. 5), the user is presented with a save button 338 and a load button 340. The user may save all session data that the user has entered and which has been calculated for the user by selecting button 338. The saved data may be saved locally on the client 104 or on the data server 124 depending on the particular application and implementation. If the data is saved on the data server 124, the data is transferred to the client 104 when the user selects the save button 338 and selects the appropriate data file. The user may also load previously saved session data by selecting the load button 340. Session data is saved and loaded by referencing a session name. When the user selects any one of the selection buttons 204-210, the user presented with a session name field 221 as illustrated generally in FIGS. 6-25. The user may supply a name for the current session in the name field 221. The session name will then be used to save and load the session data as a reference for the user.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the system and methods described herein. It will be noted that alternative embodiments of each of the system and methods of the present disclosure may not include all of the features described yet still benefit from at least some of the advantages of such features. Those of ordinary skill in the art may readily devise their own implementations of systems and methods that incorporate one or more of the features of the present invention and fall within the spirit and scope of the present disclosure.

For example, although the software concepts disclosed herein are described as already being loaded or otherwise maintained on a computing device (e.g., either a client or server machine), it should be appreciated that the present disclosure is intended to cover the software concepts described herein irrespective of the manner in which such software concepts are disseminated. For instance, the software concepts of the present disclosure, in practice, could be disseminated via any one or more types of a recordable data storage medium such as a modulated carrier signal, a magnetic data storage medium, an optical data storage medium, a biological data storage medium, an atomic data storage medium, and/or any other suitable storage medium.

The invention claimed is:

1. A network server comprising:
a processor, and
a memory device electrically coupled to the processor, the memory device having stored therein a plurality of instructions which, when executed by the processor, cause the processor to:
retrieve from a client machine a media weight value associated with the advertisement;
determine a wearout value for the advertisement;
determine an effective delivery value of the advertisement based on the media weight value and the wearout value;
retrieve from the client machine an initial sales effectiveness value for the advertisement;
determine a final sales effectiveness value based on the initial sales effectiveness value;
determine an in-market result value for the advertisement based on the effective delivery value and the sales effectiveness value; and
transmit the in-market result value to the client machine.

2. The network server of claim 1, wherein to retrieve from a client machine comprises to retrieve from a client machine via a network.

3. The network server of claim 2, wherein the network is a publicly-accessible global network.

4. The network server of claim 1, wherein the effective delivery value is determined according to the function:

$$ED = 1 - e^{C_1 \cdot MW}$$

wherein $C_1$ is a constant and MW is the media weight value.

5. The network server of claim 1, wherein the final sales effectiveness value is determined according to the function:

$$DV = [(C_2 \cdot \ln(\%D) + C_3]$$

wherein %D is a distribution percentage of a product advertised in the advertisement and $C_2$ and $C_3$ are constants.

6. The network server of claim 1, wherein to determine the final sales effectiveness value comprises to determine a price value according to the function:

$$PV = (PP/AP)$$

wherein PP is a price of a product advertised in the advertisement and AP is an average product category price of the product.

7. The network server of claim 1, wherein to determine the in-market result value comprises to determine the in-market result value for the advertisement prior to publication of the advertisement.

8. The network server of claim 1, wherein to determine the in-market result value comprises to determine a normal competitive environment factor value according to the function:

$$NCEFV = ((C_5 \cdot C_6)/NB)$$

wherein NB is substantially equal to the number of brands in a product category of a product advertised in the advertisement and $C_5$ and $C_6$ are constants.

9. The network server of claim 1, wherein the plurality of instructions when executed by the processor further cause the processor to determine an airing pattern factor value of the advertisement and to determine a normal competitive environment factor value of a product advertised in the advertisement, wherein to determine the in-market result comprises to determine the in-market result value based on the effective delivery value, the sales effectiveness value, the airing pattern factor value, and the normal competitive environment factor value.

10. The network server of claim 1, wherein to determine the in-market result value comprises to determine a percentage value of a change in product category volume of a product advertised in the advertisement.

11. A network server comprising:
a processor, and
a memory device electrically coupled to the processor, the memory device having stored therein a plurality of instructions which, when executed by the processor, cause the processor to:
retrieve from a client machine a total media weight value;
divide the total media weight value into a number of media weight portions;
retrieve an initial sales effectiveness value for each advertisement of a plurality of advertisements from the client machine;
determine a final sales effectiveness value for each of the plurality of advertisements based on the respective initial sales effectiveness value;
determine an effective delivery per media weight portion value for each of the plurality of advertisements;
calculate a selling power value for each of the plurality of advertisements; wherein the selling power value for each of the plurality of advertisements is based on the respective sales effectiveness value and the respective effective delivery per media weight portion value associated with each of the plurality of advertisements and on one of the number of media weight portions; and
apply the one of the number of media weight portions to an advertisement of the plurality of advertisements having the largest selling power value determined in the calculate step.

12. The network server of claim 11, wherein the final sales effectiveness value is determined according to the function:

$$FSE = ISE * \{[(C_2 * \ln(\%D) + C_3]/(PP/AP)\}$$

wherein ISE is the initial sales effectiveness value, %D is a distribution percentage of a product advertised in the advertisement, PP is the price of the product, AP is the average product category price of the product, and $C_2$ and $C_3$ are constants.

13. The network server of claim 11, wherein the effective delivery per media weight portion value is determined according to the function:

$$ED = 1 - e^{C1*MWP}$$

wherein C1 is a constant and MWP is the one of the number of media weight portion.

14. The network server of claim 11, wherein to determine the effective delivery per media weight portion value comprises to determine a ratio value of a gross rating point value per media weight portion.

15. The network server of claim 14, wherein the effective delivery per media weight portion value is determined according to the function:

$$ED = 1 - e^{C1*RV*MWP}$$

wherein C1 is a constant, RV is the ratio value, and MWP is the one of the number of media weight portion.

16. The network server of claim 11, wherein to calculate the selling power value comprises to multiply the respective sales effectiveness value, the respective effective delivery per media weight portion value, and the one of the number of media weight portions.

17. A tangible, computer-readable medium having stored thereon a plurality of instructions which, when executed by a processor, cause the processor to:
determine a media weight value for an advertisement;
determine a wearout value for the advertisement;
determine an effective delivery value for the advertisement based on the media weight value and the wearout value;
determine a sales effectiveness value for the advertisement; and
determine an in-market result value for the advertisement based on the effective delivery value and the sales effectiveness value.

18. A tangible, computer-readable medium having stored thereon a plurality of instructions which, when executed by a processor, cause the processor to:
determine a total media weight value;
divide a total media weight value into a number of media weight portions;
determine a sales effectiveness value for each advertisement of a plurality of advertisements;
determine an effective delivery per media weight portion value for each of the plurality of advertisements;
calculate a selling power value for each of the plurality of advertisements, wherein the selling power value is calculated based on the respective sales effectiveness value and the respective effective delivery per media weight portion associated with each of the plurality of advertisements and on one of the number of media weight portions; and
apply the one of the number of media weight portions to an advertisement of the plurality of advertisements having the largest selling power value determined in the calculating step.

19. A computer comprising:
a display;
a processor communicatively coupled to the display; and
a memory device electrically coupled to the processor, the memory device having stored therein a plurality of instructions which, when executed by the processor, cause the processor to:
receive a media weight value and a sales effectiveness value of an advertisement;
determine a wearout value for the advertisement;
determine an effective delivery value of the advertisement based on the media weight value and the wearout value; and
determine an in-market result value for the advertisement based on the effective delivery value and the sales effectiveness value, and
display the in-market result value on the display.

20. The computer of claim 19, wherein to receive a media weight value comprises to receive an amount of gross rating points to be spent on the advertisement.

21. The computer of claim 19, wherein to receive the media weight value comprises to receive an amount of currency to be spent on the advertisement and wherein the plurality of instructions further cause the processor to convert the amount of currency to an amount of gross rating points.

22. The computer of claim 19, wherein to determine the effective delivery value comprises to determine the effective delivery value according to the function:

$$ED = 1 - e^{C1*MW}$$

wherein C1 is a constant and MW is the media weight value.

23. The computer of claim 19, wherein the plurality of instructions further cause the processor to determine a distribution value of a product advertised in the advertisement.

24. The computer of claim 23, wherein to determine the distribution value comprises to determine the distribution value according to the function:

$$DV = [(C_2 * \ln(\%D) + C_3]$$

wherein %D is a distribution percentage of the product and $C_2$ and $C_3$ are constants.

25. The computer of claim 19, wherein to determine the in-market result value comprises to determine a price value of a product advertised in the advertisement.

26. The computer of claim 25, wherein to determine the price value comprises to determine the price value of the product advertised according to the function:

$$PV = (PP/AP)$$

wherein PP is a price of the product and AP is an average product category price of the product.

27. The computer of claim 19, wherein the plurality of instructions further cause the processor to determine a distribution value of a product advertised in the advertisement, determine a price value of the product, and determine a final sales effectiveness value based on the sales effectiveness value, the distribution value, and the price value.

28. The computer of claim 27, wherein the final sales effectiveness value is determined according to the function:

$$FSE = ISE * \{[(C_2 * \ln(\%D) + C_3]/(PP/AP)\}$$

wherein ISE is the initial sales effectiveness value, %D is a distribution percentage of the product, PP is a price of the product, AP is an average product category price of the product, and $C_2$ and $C_3$ are constants.

29. The computer of claim 19, wherein to determine the in-market result value comprises to determine the in-market result value for the advertisement prior to publication of the advertisement.

30. The computer of claim 19, wherein the plurality of instructions further cause the processor to determine an airing pattern factor value for the advertisement and wherein to determine the in-market result comprises to determine the in-market result value based on the effective delivery value, the sales effectiveness value, and the airing pattern factor value.

31. The computer of claim 30, wherein to determine an airing pattern factor value comprises to determine a flighting variable, wherein the flighting variable is equal to about 0.0 if the airing pattern of the advertisement is substantially continuous over a number of advertising periods and is equal to about 1.0 if the airing pattern is flighted.

32. The computer of claim 19, wherein the plurality of instructions further cause the processor to determine a normal competitive environment factor value of a product advertised in the advertisement and wherein to determine the in-market result comprises to determine the in-market result value based on the effective delivery value, the sales effectiveness value, and the normal competitive environment factor value.

33. The computer of claim 32, wherein the normal competitive environment factor value is determined according to the function:

$$NCEFV = ((C_5 * C_6)/NB)$$

wherein NB is substantially equal to the number of brands in a product category of a product advertised in the advertisement and $C_5$ and $C_6$ are constants.

34. The computer of claim 19, further the plurality of instructions further cause the processor to determine an airing pattern factor value of the advertisement and a normal competitive environment factor value of a product advertised in the advertisement, wherein to determine the in-market result comprises to determine the in-market result value based on the effective delivery value, the sales effectiveness value, the airing pattern factor value, and the normal competitive environment factor value.

35. The computer of claim 34, wherein to determine the in-market result value comprises to determine a percentage value of a change in product category volume of a product advertised in the advertisement.

36. The computer of claim 35, wherein the percentage value is determined according to the function:

$$PV = (C_7 * ED * SE * APF * NCE)$$

wherein ED is the effective delivery value, SE is the sales effectiveness value, APF is the airing pattern factor value, NCE is the normal competitive environment factor value, and $C_7$ is a constant.

37. The computer of claim 32, wherein to determine the in-market result value comprises to determine a percentage value of a change in product category volume of a product advertised in the advertisement.

38. The computer of claim 37, wherein the percentage value is determined according to the function:

$$PV = (C_8 * NCE)$$

wherein NCE is the normal competitive environment factor value and $C_8$ is a constant.

39. The computer of claim 19, wherein to determine the in-market result value comprises to determine a selling power delivered value for the advertisement based on the effective delivery value and the sales effectiveness value.

40. The computer of claim 19, wherein the plurality of instructions further cause the processor to transmit the in-market result value to a user over a network.

41. The computer of claim 40, wherein to transmit the in-market result value to the user over the network comprises to transmit the in-market result value to the user over a publicly-accessible global network.

42. A computer comprising:
a processor communicatively coupled to the display; and
a memory device electrically coupled to the processor, the memory device having stored therein a plurality of instructions which, when executed by the processor, cause the processor to:
receive a total media weight value;
divide the total media weight value into a number of media weight portions;
determine a sales effectiveness value for each of the plurality of advertisements;
determine an effective delivery per media weight portion value for each of the plurality of advertisements;
calculate a selling power value for each of the plurality of advertisements, wherein the selling power value for each of the plurality of advertisements is based on the respective sales effectiveness value and the respective effective delivery per media weight portion value associated with each of the plurality of advertisements and on one of the number of media weight portions; and apply the one of the number of media weight portions to an advertisement of the plurality of advertisements having the largest selling power value determined in the calculating step.

43. The computer of claim 42, wherein to receive the total media weight value comprises to receive an amount of gross rating points.

44. The computer of claim 42, wherein to receive the total media weight value comprises to receive an amount of currency.

45. The computer of claim 42, wherein to determine the sales effectiveness value comprises to determine a distribution value of a product advertised in each advertisement.

46. The computer of claim 45, wherein to the distribution value is determined according to the function:

$$DV=[(C_2*\ln(\%D)+C_3]$$

wherein %D is a distribution percentage of the product and $C_2$ and $C_3$ are constants.

47. The computer of claim 42, wherein to determine the sales effectiveness value comprises to determine a price value of a product advertised in each advertisement.

48. The computer of claim 47, wherein the price value is determined according to the function:

$$PV=(PP/AP)$$

wherein PP is a price of the product and AP is an average product category price of the product.

49. The computer of claim 42, wherein to determine the sales effectiveness value comprises to determine an initial sales effectiveness value for each advertisement, determining a distribution value of a product advertised in each advertisement, determine a price value of the product, and determine a final sales effectiveness value for each advertisement based on the initial sales effectiveness value of the each advertisement, the distribution value, and the price value.

50. The computer of claim 49, wherein the final sales effectiveness value is determined according to the function:

$$FSE=ISE*\{[(C_2*\ln(\%D)+C_3]/(PP/AP)\}$$

wherein ISE is the initial sales effectiveness value, %D is a distribution percentage of a product advertised in the advertisement, PP is the price of the product, AP is the average product category price of the product, and $C_2$ and $C_3$ are constants.

51. The computer of claim 42, wherein the effective delivery per media weight portion value is determined according to the function:

$$ED=1-e^{C1*MWP}$$

wherein C1 is a constant and MWP is the one of the number of media weight portions.

52. The computer of claim 42, wherein to determine the effective delivery per media weight portion value comprises to determine a ratio value of a gross rating point value per media weight portions.

53. The computer of claim 52, wherein the effective delivery per media weight portion is determined according to the function:

$$ED=1-e^{C1*RV*MWP}$$

wherein C1 is a constant, RV is the ratio value, and MWP is the one of the number of media weight portions.

54. The computer of claim 42, wherein to calculate the selling power value comprises multiplying the respective sales effectiveness value, the respective effective delivery per media weight portion value, and the one of the number of media weight portions.

55. The computer of claim 42, wherein the plurality of instructions further cause the processor to deduct the one of the number of media weight portions from the total media weight value after the applying step.

* * * * *